United States Patent
Kihara

(10) Patent No.: US 10,712,157 B2
(45) Date of Patent: Jul. 14, 2020

(54) PHYSICAL QUANTITY SENSOR, ELECTRONIC DEVICE, AND VEHICLE

(71) Applicant: Seiko Epson Corporation, Tokyo (JP)

(72) Inventor: Ryuji Kihara, Matsumoto (JP)

(73) Assignee: Seiko Epson Corporation (JP)

(*) Notice: Subject to any disclaimer, the term of this patent is extended or adjusted under 35 U.S.C. 154(b) by 185 days.

(21) Appl. No.: 15/945,328

(22) Filed: Apr. 4, 2018

(65) Prior Publication Data

US 2018/0292210 A1    Oct. 11, 2018

(30) Foreign Application Priority Data

Apr. 5, 2017 (JP) ................. 2017-075011

(51) Int. Cl.
*G01C 19/5656* (2012.01)
*G01P 15/125* (2006.01)

(52) U.S. Cl.
CPC ........ *G01C 19/5656* (2013.01); *G01P 15/125* (2013.01)

(58) Field of Classification Search
CPC .... G01P 15/125; G01P 15/08; G01P 15/0802; G01C 19/5642; G01C 19/5649; G01C 19/5656
See application file for complete search history.

(56) References Cited

U.S. PATENT DOCUMENTS

| 6,149,190 | A | 11/2000 | Galvin et al. |
| 6,450,031 | B1* | 9/2002 | Sakai ............ B81B 3/0086 73/514.16 |
| 6,973,829 | B2 | 12/2005 | Sakai et al. |
| 7,505,245 | B2 | 3/2009 | Yokoyama |
| 8,418,557 | B2 | 4/2013 | Yazawa et al. |
| 8,516,886 | B2 | 8/2013 | Acar et al. |
| 8,516,890 | B2 | 8/2013 | Rehle |
| 2001/0025530 | A1* | 10/2001 | Sakai ............ B81B 3/0008 73/514.32 |
| 2002/0000124 | A1* | 1/2002 | Sakai ............ G01P 15/125 73/514.32 |
| 2002/0011107 | A1 | 1/2002 | Sakai et al. |
| 2003/0186480 | A1* | 10/2003 | Okumura ............ B81C 1/00365 438/48 |

(Continued)

FOREIGN PATENT DOCUMENTS

JP    2006-084326 A    3/2006
JP    2013-533461 A    8/2013

(Continued)

OTHER PUBLICATIONS

Extended European Search Report for Patent Application No. EP 18165656.2, dated Aug. 20, 2018 (5 pages).

*Primary Examiner* — Helen C Kwok
(74) *Attorney, Agent, or Firm* — Harness, Dickey & Pierce, P.L.C.

(57) ABSTRACT

A physical quantity sensor includes a base, a suspension beam facing the base, a fixing anchor fixing the suspension beam to the base, a fixed electrode extending orthogonally from the suspension beam, and a movable electrode facing the fixed electrode at an interval. The width of a distal end of the suspension beam distant from the fixing anchor is narrower than the width of a proximal end adjacent to the fixing anchor.

20 Claims, 22 Drawing Sheets

(56) References Cited

U.S. PATENT DOCUMENTS

| | | | |
|---|---|---|---|
| 2006/0032310 A1* | 2/2006 | Merassi | B81B 7/0048 |
| | | | 73/514.35 |
| 2006/0057758 A1 | 3/2006 | Yokoyama | |
| 2007/0273393 A1* | 11/2007 | Furukubo | G01P 15/0802 |
| | | | 324/661 |
| 2009/0017579 A1* | 1/2009 | Jeong | B81C 1/00039 |
| | | | 438/106 |
| 2009/0243005 A1* | 10/2009 | Yokoyama | B81C 1/00182 |
| | | | 257/415 |
| 2010/0281980 A1 | 11/2010 | Yazawa et al. | |
| 2011/0049648 A1* | 3/2011 | Geisberger | B81C 1/00182 |
| | | | 257/415 |
| 2011/0265564 A1 | 11/2011 | Acar et al. | |
| 2013/0247667 A1* | 9/2013 | Malvern | G01P 15/125 |
| | | | 73/514.32 |
| 2017/0010295 A1* | 1/2017 | Kigure | G01P 15/125 |
| 2017/0074658 A1* | 3/2017 | Tanaka | G01C 19/5755 |

FOREIGN PATENT DOCUMENTS

| | | |
|---|---|---|
| WO | WO-2009-099125 A1 | 8/2009 |
| WO | WO-2010-032821 A1 | 3/2010 |

\* cited by examiner

PHYSICAL QUANTITY SENSOR, ELECTRONIC DEVICE, AND VEHICLE

BACKGROUND

1. Technical Field

The present invention relates to a physical quantity sensor, an electronic device, and a vehicle.

2. Related Art

In recent years, a sensor manufactured using a silicon micro electro mechanical system (MEMS) technology has been developed. As such a sensor, a capacitance-type physical quantity sensor including a fixed electrode fixedly disposed by one anchor, and a movable electrode provided so as to face the fixed electrode at an interval and to be displaceable, and measuring physical quantities such as an acceleration and an angular velocity based on the capacitance between these two electrodes has been known (see, for example, U.S. Pat. No. 8,516,890).

For example, the physical quantity sensor according to U.S. Pat. No. 8,516,890 has two fixed electrodes and movable electrodes formed separately from a single silicon wafer. In the physical quantity sensor, each fixed electrode includes a fixing portion fixed to a substrate surface by an anchor, a beam-like suspension beam (web) linearly extending from the fixing portion and having a certain width dimension, and a plurality of fixed branch electrodes (fixed electrode fingers) arranged to extend like a comb teeth shape from the suspension beam. On the other hand, the movable electrode includes a support frame supported by an elastic support on the substrate surface so as to be displaceable along the substrate surface, and a plurality of branch electrodes (movable opposing electrode fingers) disposed to extend from a weight so as to face a plurality of branch electrodes (fixed electrode fingers) of the above-described fixed electrode, from two opposing support frames.

However, in a physical quantity sensor in U.S. Pat. No. 8,516,890, the suspension beam extends from the fixing portion fixedly disposed by one anchor. With such a configuration, for example, in a case where an impact is applied to the physical quantity sensor from the outside, there is a risk of breakage of the suspension beam due to the stress concentration occurring in the connecting interface between the fixing portion supported at one point and the suspension beam extending from the fixing portion.

SUMMARY

An advantage of some aspects of the invention is to solve at least a part of the problems described above, and the invention can be implemented as the following forms or application examples.

Application Example 1

A physical quantity sensor according to this application example includes a base; a suspension beam provided so as to face the base; a fixing anchor that fixes the suspension beam to the base; a fixed electrode that is provided in the suspension beam, a longitudinal direction of the fixed electrode corresponding to a second direction orthogonal to a first direction in which the suspension beam and the fixing anchor are arranged in plan view; and a movable electrode that is provided so as to face the fixed electrode at an interval, a width of the suspension beam along the second direction is narrower on a side opposite to the fixing anchor side than on the fixing anchor side, in the first direction, in plan view.

According to the physical quantity sensor of this application example, since the width of the suspension beam in the second direction is narrower in a portion away from the fixing anchor in the first direction than in the root end connected to the fixing anchor, it is possible to reduce (lighten) the mass of the suspension beam without reducing the strength of the connecting interface between the fixing anchor and the suspension beam. That is, it is possible to reduce the stress generated in the connecting interface between the fixing anchor and the suspension beam while maintaining the robustness of the suspension beam. This makes it possible to reduce the risk of breakage of the suspension beam due to stress concentration occurring in the connecting interface between the fixing anchor and the suspension beam.

Application Example 2

A physical quantity sensor according to this application example includes a base; a suspension beam provided so as to face the base; a fixing anchor that fixes the suspension beam to the base; a fixed electrode that is provided in the suspension beam, a longitudinal direction of the fixed electrode corresponding to a second direction orthogonal to a first direction in which the suspension beam and the fixing anchor are arranged in plan view; and a movable electrode that is provided so as to face the fixed electrode at an interval, the suspension beam is provided with at least one of a recess and a through-hole.

According to the physical quantity sensor of this application example, since at least one of the recess and the through-hole is provided in the suspension beam, it is possible to reduce (lighten) the mass of the suspension beam without reducing the strength of the connecting interface between the fixing anchor and the suspension beam. That is, it is possible to reduce the stress generated in the connecting interface between the fixing anchor and the suspension beam while maintaining the robustness of the suspension beam. This makes it possible to reduce the risk of breakage of the suspension beam due to stress concentration occurring in the connecting interface between the fixing anchor and the suspension beam.

Application Example 3

In the physical quantity sensor of the application example, it is preferable that in plan view, the width of the suspension beam along the second direction is narrowed from the fixing anchor side toward the first direction.

According to this application example, since the width of the suspension beam gradually decreases toward the first direction from the root end connected to the fixing anchor, it is possible to reduce the mass of the suspension beam, prevent occurrence of stress concentration in the suspension beam, and further reduce the risk of breakage of the suspension beam.

Application Example 4

In the physical quantity sensor of the application example, it is preferable that the fixing anchor does not overlap the suspension beam, in plan view.

According to this application example, since the fixing anchor and the suspension beam can be distinguished, it is possible to reduce the influence of variations in the fixed state of the fixing anchor on the suspension beam.

Application Example 5

In the physical quantity sensor of the application example, it is preferable that the physical quantity sensor further includes a connecting portion that is disposed between the suspension beam and the fixing anchor and is connected to the suspension beam and the fixing anchor, in plan view.

According to this application example, the connecting portion allows the fixing anchor and the suspension beam to be spaced apart from each other, and thus the impact applied to the suspension beam can be alleviated. This makes it possible to reduce the risk of breakage of the suspension beam.

Application Example 6

In the physical quantity sensor of the application example, it is preferable that the fixing anchor overlaps at least a part of the suspension beam, in plan view.

According to this application example, since the fixing anchor is disposed to overlap at least a part of the suspension beam, in plan view, it is possible to reduce the arrangement area between the fixing anchor and the suspension beam. Therefore, it is possible to provide a small physical quantity sensor.

Application Example 7

In the physical quantity sensor of the application example, it is preferable that the physical quantity sensor further includes two suspension beams, and in plan view, the fixing anchor is disposed between the two suspension beams.

According to this application example, since a suspension beam extends toward both directions sandwiching the fixing anchor, it is possible to increase the number of fixed electrodes provided in the suspension beam, thereby improving detection sensitivity.

Application Example 8

An electronic device according to this application example includes the physical quantity sensor described in any one of the application examples.

According to this application example, since a physical quantity sensor in which the risk of breakage of a suspension beam due to stress concentration is reduced is provided, it is possible to provide an electronic device with improved impact resistance.

Application Example 9

A vehicle according to this application example includes the physical quantity sensor described in any one of the application examples and an attitude control device that controls an attitude, based on a detection signal from the physical quantity sensor.

According to this application example, it is possible to provide a vehicle excellent in attitude control, the vehicle including a physical quantity sensor in which the risk of breakage of a suspension beam due to stress concentration is reduced and impact resistance is improved, and an attitude control device that controls an attitude, based on a detection signal from the physical quantity sensor.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, an electronic device, and a vehicle according to the invention will be described in detail based on preferred embodiments shown in the accompanying drawings.

1. Physical Quantity Sensor

Figure 2:
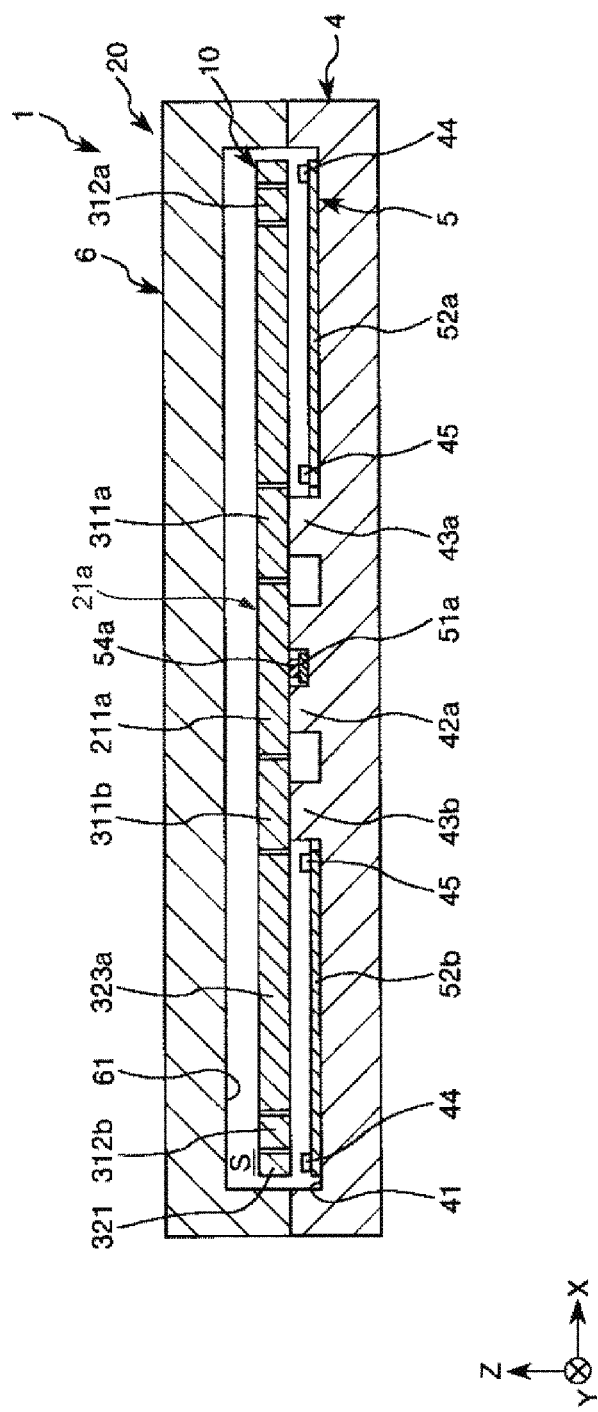
FIG. 2 is A-A line sectional view of FIG. 1.
Figure 3:
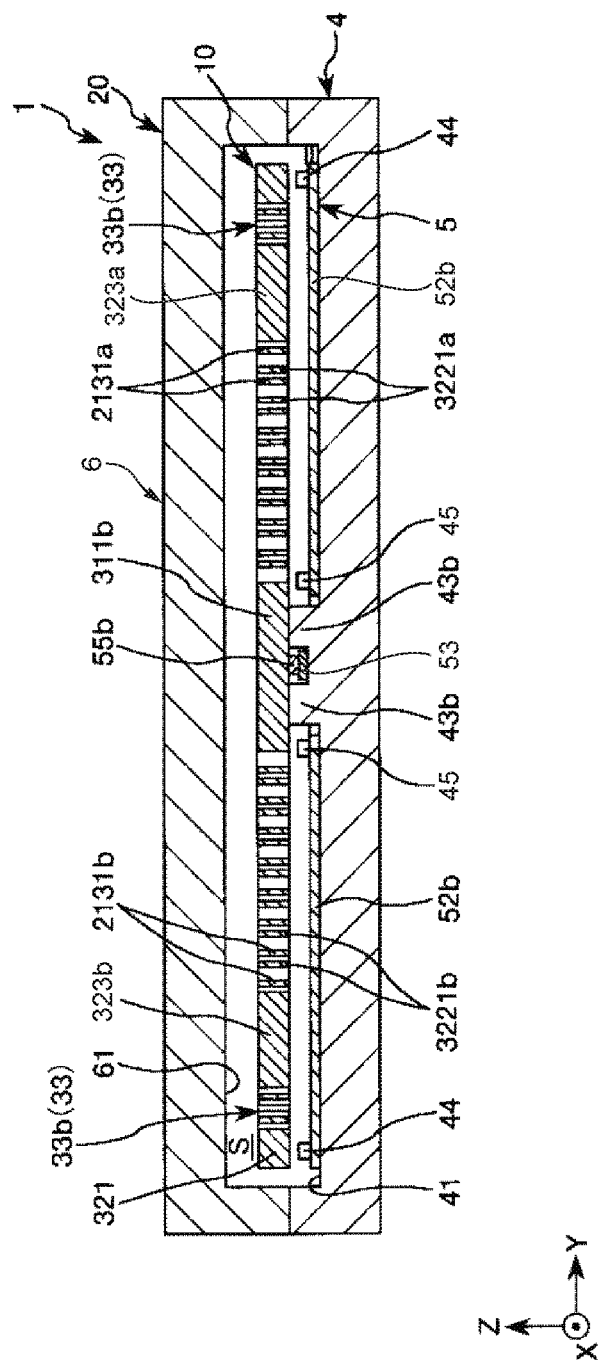
FIG. 3 is B-B line sectional view of FIG. 1.

First, a physical quantity sensor according to the invention will be described. In the drawings referred to in the following description of the physical quantity sensor, for convenience of explanation, a X axis, a Y axis and a Z axis, which are three axes orthogonal to each other, are indicated by arrows, and the tip end side of the arrow is referred to as "+ (plus)" and the proximal end side is referred to as "− (minus)". In the following description, the direction (second direction) parallel to the X axis is referred to as "X-axis direction", the direction (first direction) parallel to the Y axis is referred to as "Y-axis direction", the direction parallel to the Z axis is referred to as "Z-axis direction". In the following description, for convenience of explanation, the upper side (+Z-axis direction side) in FIG. 2 and FIG. 3 is referred to as "upper", and the lower side (−Z-axis direction side) is referred to as "lower".

First Embodiment

Figure 1:
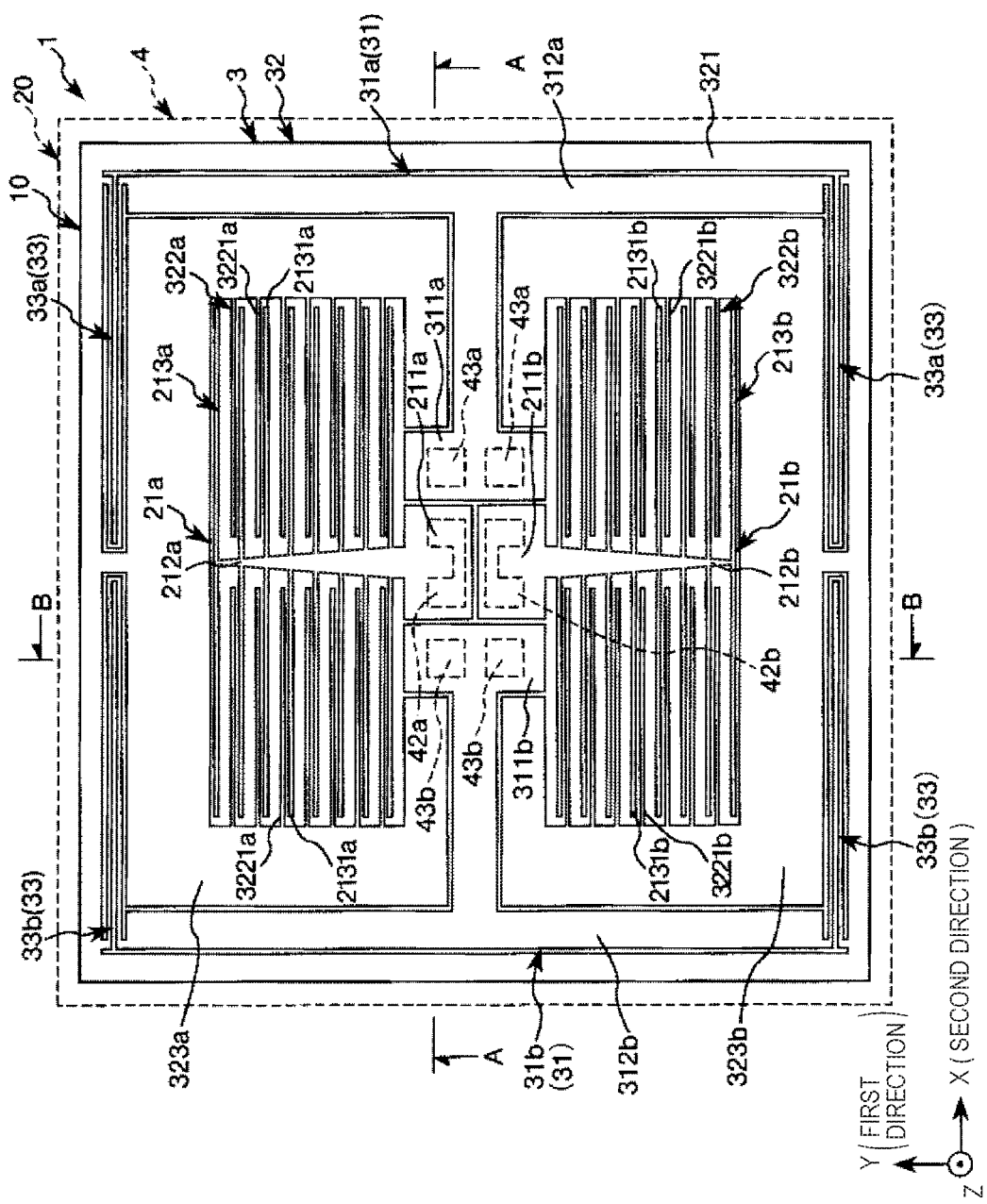
FIG. 1 is a plan view illustrating a physical quantity sensor according to a first embodiment of the invention.
Figure 4:
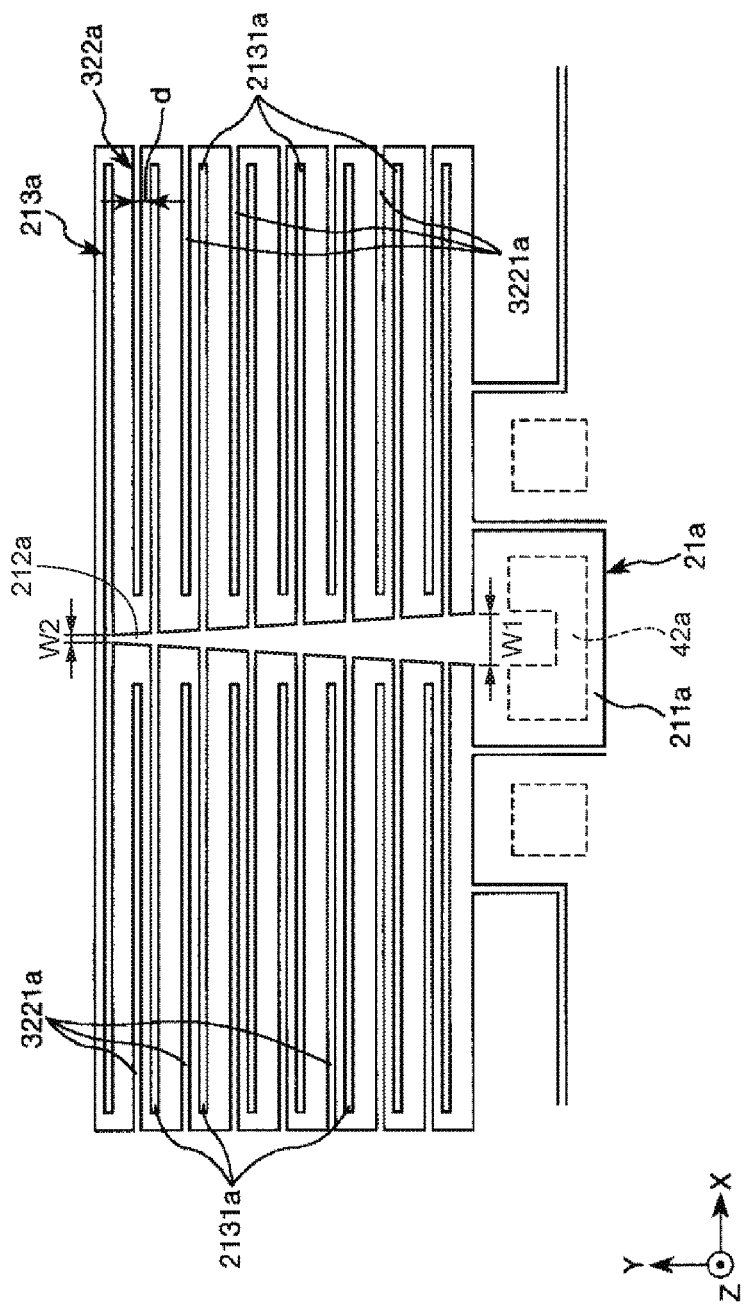
FIG. 4 is a partial enlarged plan view for explaining a first fixed electrode and a first movable electrode included in the physical quantity sensor shown in FIG. 1.

A physical quantity sensor according to the first embodiment of the invention will be described below with reference to FIGS. 1 to 4. FIG. 1 is a plan view illustrating the physical quantity sensor according to the first embodiment of the invention, FIG. 2 is A-A line sectional view of FIG. 1, and FIG. 3 is B-B line sectional view of FIG. 1. FIG. 4 is a partial enlarged plan view for explaining a first fixed electrode and a first movable electrode included in the physical quantity sensor shown in FIG. 1.

As illustrated in FIGS. 1 to 4, the physical quantity sensor 1 of the present embodiment includes a sensor element 10, a substrate 4 as a base supporting the sensor element 10, a wiring pattern 5 electrically connected to the sensor element 10 on the substrate 4, and a cover member 6 (lid) bonded to the substrate 4 so as to cover the sensor element 10. Here, the substrate 4 and the cover member 6 constitute the package 20 forming the space S accommodating the sensor element 10. Each part of the physical quantity sensor 1 will be sequentially described below.

Sensor Element

As illustrated in FIG. 1, the sensor element 10 includes a first fixed electrode-side fixing portion 21a, a second fixed electrode-side fixing portion 21b, and a movable electrode-side fixing portion 31 which are fixed to the substrate 4, a movable mass 32 surrounding these electrode-side fixing portions in plan view, and an elastic interconnect 33 connecting the movable electrode-side fixing portion 31 and the movable mass 32. In addition, the first fixed electrode-side fixing portion 21a, the second fixed electrode-side fixing portion 21b, the movable electrode-side fixing portion 31, the movable mass 32, and the elastic interconnect 33 are disposed along the upper surface (the surface on a side at which the sensor element 10 is provided) as the main surface of the substrate 4, as shown in FIGS. 2 and 3.

Here, the movable electrode-side fixing portion 31, the movable mass 32, and the elastic interconnect 33 are integrally formed to constitute a movable electrode-side structure 3. That is, the sensor element 10 includes a first fixed electrode-side fixing portion 21a, the second fixed electrode-side fixing portion 21b, and the movable electrode-side structure 3 which are spaced apart from each other, and the movable electrode-side structure 3 includes a movable electrode-side fixing portion 31, a movable mass 32 and an elastic interconnect 33 which are integrally formed. Further, the movable electrode-side fixing portion 31 includes a first movable electrode-side fixing portion 31a and a second movable electrode-side fixing portion 31b. The elastic interconnect 33 has two first elastic interconnects 33a and two second elastic interconnects 33b. In the present embodiment, the sensor element 10 has a shape that is rotationally symmetrical in plan view, and has a symmetrical shape with respect to the X-axis direction and the Y-axis direction.

The first fixed electrode-side fixing portion 21a and the second fixed electrode-side fixing portion 21b are disposed side by side along the Y-axis direction. Here, the first fixed electrode-side fixing portion 21a is disposed on the +Y-axis direction side with respect to the center of the sensor element 10, whereas the second fixed electrode-side fixing portion 21b is disposed on the −Y-axis direction side with respect to the center of the sensor element 10.

The first fixed electrode-side fixing portion 21a includes a fixing anchor 211a connected to the substrate 4 through a first protrusion 42a, a first extending arm 212a, which is a suspension beam, extending along the first direction (+Y-axis direction) from the fixing anchor 211a and being spaced apart from the substrate 4, and a first fixed electrode 213a connected to the first extending arm 212a. The first fixed electrode 213a is configured with a plurality of first fixed electrode fingers 2131a, as fixed electrodes, one end of which is supported by the first extending arm 212a (see FIG. 4). The plurality of first fixed electrode fingers 2131a extend along respective directions (+X-axis direction and −X-axis direction) of the second direction intersecting with the first direction from the first extending arm 212a and are disposed side by side at intervals along the Y-axis direction to constitute a "first fixed electrode comb" of a comb teeth shape.

Similarly, the second fixed electrode-side fixing portion 21b includes a fixing anchor 211b connected to the substrate 4 through a second protrusion 42b, a second extending arm 212b, which is a suspension beam, extending along the first direction (−Y-axis direction) from the fixing anchor 211b, and a second fixed electrode 213b connected to the second extending arm 212b. The second fixed electrode 213b is configured with a plurality of second fixed electrode fingers 2131b which are disposed side by side along the Y-axis direction with respect to the above-described first fixed electrode 213a, and one end of which is supported by the second extending arm 212b, as fixed electrodes. A plurality of second fixed electrode fingers 2131b extend along directions (+X-axis direction and −X-axis direction) of the second direction from the second extending arm 212b and are disposed side by side at intervals along the Y-axis direction, and constitute a "second fixed electrode comb" of a comb teeth shape.

The first extending arm 212a and the second extending arm 212b which are suspension beams are formed such that the width of the tip end (distal end) that is apart (distant) from the fixing anchors 211a and 211b in the first direction (Y axis direction) is narrower than the width in the second direction (X axis direction) of the root end connected to the fixing anchors 211a and 211b. This will be described in detail by exemplifying the first extending arm 212a in FIG. 4. In addition, the first extending arm 212a and the second extending arm 212b are configured to be line symmetrical with respect to the X axis. However, the configuration of the first extending arm 212a will be described as a representative, and the description of the second extending arm 212b will be omitted.

As illustrated in FIG. 4, the first extending arm 212a is formed such that the width W2 of the tip end (distal end) that is apart (distant) from the fixing anchor 211a in the first direction (+Y axis direction) is narrower than the width W1 in the second direction (X axis direction) of the root end (proximal end) connected to (adjacent) the fixing anchor 211a.

The first extending arm 212a of the present embodiment is formed such that the width in the second direction (X-axis direction) gradually decreases (tapers) from width W1 to width W2, from the root end connected to the fixing anchor 211a toward the first direction (+Y-axis direction). Specifically, it is configured such that edges on both sides of the X-axis direction of the first extending arm 212a, from which a plurality of first fixed electrode fingers 2131a extend in plan view from the +Z-axis direction, are inclined inwardly (converge), from the fixing anchor 211a towards the first direction (+Y-axis direction). In other words, the lengths of the plurality of first fixed electrode fingers 2131a are shorter in the region on the fixing anchor 211a side than in the tip end side which is separated in the first direction (+Y-axis direction). In addition, the lengths of the plurality of first fixed electrode fingers 2131a may be made uniform along the slope of the edge of the first extending arm 212a and may be the same length.

In this way, the width of the first extending arm 212a gradually decreases from the root end connected to the fixing anchor 211a toward the first direction, so that it is possible to reduce the mass of the first extending arm 212a, prevent the occurrence of the stress concentration in the first extending arm 212a, and further reduce the risk of breakage of the first extending arm 212a.

Further, in plan view from the +Z-axis direction, the first extending arm 212a, the second extending arm 212b, and the fixing anchors 211a and 211b are disposed such that the fixed positions thereof are not overlapped. In this way, it is possible to distinguish between the first extending arm 212a and the fixing anchor 211a, and between the second extending arm 212b and the fixing anchor 211b, thereby reducing the influence of the variation in the fixed state and the like on the states of the first extending arm 212a and the fixing anchor 211a.

On the other hand, the first movable electrode-side fixing portion 31a and the second movable electrode-side fixing portion 31b are disposed side by side along the X-axis direction crossing the Y-axis direction. Here, the first movable electrode-side fixing portion 31a is disposed on the +X-axis direction side with respect to the center of the sensor element 10, whereas the second movable electrode-side fixing portion 31b is disposed on the −X-axis direction side with respect to the center of the sensor element 10. In the present embodiment, in plan view, the first movable electrode-side fixing portion 31a is disposed on the +X-axis direction side and the second movable electrode-side fixing portion 31b is disposed on the −X-axis direction side, with respect to the fixing anchors 211a and 211b. However, the first fixed electrode-side fixing portion 21a and the second fixed electrode-side fixing portion 21b have parts (fixing anchors 211a and 211b) located between the first movable electrode-side fixing portion 31a and the second movable electrode-side fixing portion 31b, respectively, in plan view.

The first movable electrode-side fixing portion 31a has a connector 311a connected to the substrate 4, and a first support 312a connected to the connector 311a. The first support 312a has a T shape in plan view, and has an arm extending along the +X-axis direction from the connector 311a and a cross-arm extending along respective directions, +Y-axis direction and the −Y-axis direction, from the end opposite to the connector 311a of the above arm.

Similarly, the second movable electrode-side fixing portion 31b has a connector 311b connected to the substrate 4, and a second support 312b connected to the connector 311b. The second support 312b has a T shape in plan view, and has an arm extending along the −X-axis direction from the connector 311b and a cross-arm extending along respective directions, +Y-axis direction and the −Y-axis direction, from the end opposite to the connector 311b of the above arm.

The first fixed electrode-side fixing portion 21a, the second fixed electrode-side fixing portion 21b, and the movable electrode-side fixing portion 31 are disposed inside the movable mass 32 having a frame shape in plan view. In other words, the movable mass 32 has a shape that surrounds the first fixed electrode-side fixing portion 21a, the second fixed electrode-side fixing portion 21b, and the movable electrode-side fixing portion 31, in plan view.

The movable mass 32 includes a frame 321 forming a frame shape in plan view, a first weight 323a and a second weight 323b connected to the frame 321, a first movable electrode 322a connected to the first weight 323a, and a second movable electrode 322b connected to the second weight 323b.

The frame 321 constitutes the outer edge of the sensor element 10, and as described above, the first fixed electrode-side fixing portion 21a, the second fixed electrode-side fixing portion 21b, and the movable electrode-side fixing portion 31 are disposed inside the frame 321.

The first weight 323a is connected to the frame 321 inside the frame 321, and is formed so as to surround the periphery of the first fixed electrode-side fixing portion 21a (mainly, the first fixed electrode 213a) in plan view. On the other hand, the second weight 323b is connected to the frame 321 inside the frame 321, and is formed so as to surround the periphery of the second fixed electrode-side fixing portion 21b (mainly, the second fixed electrode 213b) in plan view.

The first movable electrode 322a has a part facing the above-described first fixed electrode 213a. Specifically, the first movable electrode 322a is supported at one end by the first weight 323a, and is configured with first movable electrode fingers 3221a which are a plurality of movable electrodes disposed and extending from the first weight 323a so as to face the plurality of first fixed electrode fingers 2131a (first fixed electrode combs) of the above-described first fixed electrode 213a at intervals d (see FIG. 4). The plurality of first movable electrode fingers 3221a extend along the X-axis direction from the first weight 323a and are disposed side by side at intervals along the Y-axis direction to constitute a "first movable electrode comb" of a comb teeth shape.

Similarly, the second movable electrode 322b has a part facing the above-described second fixed electrode 213b. Specifically, the second movable electrode 322b is supported at one end by the second weight 323b, and is configured with second movable electrode fingers 3221b which are a plurality of movable electrodes disposed and extending from the second weight 323b so as to face the plurality of second fixed electrode fingers 2131b of the above-described second fixed electrode 213b at intervals. The plurality of second movable electrode fingers 3221b extend along the X-axis direction from the second weight 323b and are disposed side by side at intervals along the Y-axis direction to constitute a "second movable electrode comb" of a comb teeth shape.

In this way, the movable mass 32 is supported through two first elastic interconnects 33a with respect to the above-described first movable electrode-side fixing portion 31a, and is supported through two second elastic interconnects 33b with respect to the above-described second movable electrode-side fixing portion 31b. However, not only the above-described first fixed electrode-side fixing portion 21a, the second fixed electrode-side fixing portion 21b, the first movable electrode-side fixing portion 31a, and the second movable electrode-side fixing portion 31b, but also two first elastic interconnects 33a and two second elastic interconnects 33b are disposed inside the frame 321 forming a frame shape, in plan view.

The two first elastic interconnects 33a respectively connect the first movable electrode-side fixing portion 31a and the movable mass 32 so that the movable mass 32 can be displaced in the Y axis direction. One first elastic interconnect 33a of the two first elastic interconnects 33a is connected to the end on the +Y-axis direction side of the first support 312a of the first movable electrode-side fixing portion 31a, and the other first elastic interconnect 33a is connected to the end on the −Y-axis direction side of the first support 312a. Similarly, the two second elastic interconnects 33b respectively connect the second movable electrode-side fixing portion 31b and the movable mass 32 so that the movable mass 32 can be displaced in the Y axis direction. One second elastic interconnect 33b of the two second elastic interconnects 33b is connected to the end on the +Y-axis direction side of the second support 312b of the second movable electrode-side fixing port ion 31b, and the other second elastic interconnect 33b is connected to the end on the −Y-axis direction side of the second support 312b.

A first elastic interconnect 33a connected to an end on the +Y-axis direction side of the first support 312a and a second elastic interconnect 33b connected to an end on the +Y-axis direction side of the second support 312b each have a shape extending in the Y-axis direction while meandering so as to repeat approaching each other and separating from each other in the X-axis direction. Similarly, a first elastic interconnect 33a connected to an end on the −Y-axis direction side of the first support 312a and a second elastic interconnect 33b connected to an end on the −Y-axis direction side of the second support 312b each have a shape extending in the Y-axis direction while meandering so as to repeat approaching each other and separating from each other in the X-axis direction.

In addition, the shapes of the first elastic interconnect 33a and the second elastic interconnect 33b are not limited to the above-described shapes as long as the movable mass 32 can be displaced in the Y-axis direction. For example, they may be configured with a single beam extending along the X-axis direction, or may be configured with three or more beams and two or more connecting portions connecting these beams to each other.

It is preferable that as the constituent materials of the first fixed electrode-side fixing portion 21a, the second fixed electrode-side fixing portion 21b, and the movable electrode-side structure 3 as described above, without being limited particularly, for example, a silicon material (single crystal silicon, polysilicon or the like) to which conductivity is imparted by doping an impurity such as phosphorus or boron is used.

The first fixed electrode-side fixing portion 21a, the second fixed electrode-side fixing portion 21b, and the movable electrode-side structure 3 can be collectively formed by etching a single substrate (for example, a silicon substrate). In this case, the thickness of each unit of the sensor element 10 can be easily and highly accurately aligned. In addition, silicon can be processed with high precision by etching.

In the sensor element 10 configured as described above, when the sensor element 10 receives the acceleration in the Y-axis direction which is the detection axis direction, the movable mass 32 is displaced in the Y-axis direction with elastic deformation of the first elastic interconnect 33a and the second elastic interconnect 33b. Then, the distance between the first fixed electrode finger 2131a of the first fixed electrode 213a and the first movable electrode finger 3221a of the first movable electrode 322a, and the distance between the second fixed electrode finger 2131b of the second fixed electrode 213b and the second movable electrode finger 3221b of the second movable electrode 322b change respectively.

However, the magnitude of the acceleration received by the sensor element 10 can be detected based on the capacitance therebetween. In the present embodiment, with respect to the distance between the first fixed electrode finger 2131a and the first movable electrode finger 3221a, and the distance between the second fixed electrode finger 2131b and the second movable electrode finger 3221b, if one distance thereof becomes large, the other distance becomes small. Therefore, with respect to the capacitance between the first fixed electrode finger 2131a and the first movable electrode finger 3221a, and the capacitance between the second fixed electrode finger 2131b and the second movable electrode finger 3221b, if the capacitance on one side thereof becomes large, the capacitance on the other side becomes small. Therefore, differential operation is performed on a signal based on the capacitance between the first fixed electrode finger 2131a of the first fixed electrode 213a and the first movable electrode finger 3221a of the first movable electrode 322a, and a signal based on the capacitance between the second fixed electrode finger 2131b of the second fixed electrode 213b and the second movable electrode finger 3221b of the second movable electrode 322b. Thus, it is possible to remove a signal component due to the displacement of the movable mass 32 other than the detection axis direction, thereby reducing noise and outputting a signal corresponding to the acceleration received by the sensor element 10.

Substrate

The substrate 4 as a base has a plate shape, and is disposed along an XY plane (reference plane) which is a plane including an X axis and a Y axis. As illustrated in FIGS. 2 and 3, a recess 41 is provided on the upper surface (the surface on which the sensor element 10 is provided) which is the main surface of the substrate 4. The recess 41 has a function of preventing a movable portion (specifically, the movable mass 32, or the like) of the sensor element 10 from contacting the substrate 4. Thus, the substrate 4 can support the sensor element 10 while allowing the sensor element 10 to be driven.

Further, as illustrated in FIG. 4, on the upper surface of the substrate 4, a first protrusion (a protrusion for the first fixed electrode-side fixing portion) 42a, a second protrusion (a protrusion for the first fixed electrode-side fixing portion) 42b, two third protrusion (protrusions for the first movable electrode-side fixing portion) 43a, and two fourth protrusions (protrusions for the second movable electrode-side fixing portion) 43b, which protrude from the bottom surface of the recess 41, are provided. Further, on the upper surface of the substrate 4, four protrusions 44 and four protrusions 45 protruding from the bottom surface of the recess 41 are provided.

The first protrusion 42a, the second protrusion 42b, the third protrusion 43a, and the fourth protrusion 43b each have a function of supporting the sensor element 10 in a state where the movable portion of the sensor element 10 is floated (separated) with respect to the substrate 4.

The fixing anchor 211a of the above-described first fixed electrode-side fixing portion 21a is bonded to the first protrusion 42a. The fixing anchor 211b of the above-described second fixed electrode-side fixing portion 21b is bonded to the second protrusion 42b. The connector 311a of the above-described first movable electrode-side fixing portion 31a is bonded to two third protrusions 43a. The connector 311b of the above-described second movable electrode-side fixing portion 31b is bonded to two fourth protrusions 43b.

The four protrusions 44 and the four protrusions 45 have a function of preventing the floating portion (in particular, the movable mass 32) of the sensor element 10 from sticking to the substrate 4. More specifically, the four protrusions 44 are disposed at positions overlapping with the outer peripheral portion (more specifically, four corner portions of the frame 321 having a quadrangular outline in plan view) of the above-described movable mass 32 in plan view. This can effectively reduce the sticking of the movable mass 32 to the substrate 4.

In addition, the four protrusions 45 are disposed at positions which are in the vicinity of a portion (a portion to which a large electric field is applied during anodic bonding) where the upper surface of the substrate 4 is exposed from the wiring pattern 5, which will be described later, in plan view and overlaps with the movable mass 32. This can effectively reduce the sticking of the movable mass 32 to the substrate 4.

As the constituent material of the substrate 4, although not particularly limited, it is preferable to use a substrate material having insulating properties, specifically, it is preferable to use a quartz substrate, a sapphire substrate, or a glass substrate, and in particular, it is preferable to use a glass material (for example, borosilicate glass such as Pyrex (registered trademark) glass) containing alkali metal ions (mobile ions). Thus, in a case where the sensor element 10 and the cover member 6 are made of silicon as a main material, they can be anodically bonded to the substrate 4.

In the drawing, the substrate 4 is formed of one member, but may be formed by bonding two or more members. For example, the substrate 4 may be formed by bonding the frame-like member and the plate-like member to each other. Further, the substrate 4 can be formed by using, for example, a photolithography method and an etching method.

Wiring Pattern

The wiring pattern 5 is provided on the upper surface of the above-described substrate 4. The wiring pattern 5 has a first fixed electrode-side wiring 51a electrically connected to the above-described first fixed electrode-side fixing portion 21a, a second fixed electrode-side wiring (not illustrated) electrically connected to the second fixed electrode-side fixing portion 21b, and movable electrode-side wirings 52a, 52b, and 53 electrically connected to the movable electrode-side fixing portion 31.

The first fixed electrode-side wiring 51a (see FIG. 2) is disposed to extend from the vicinity of the above-described first protrusion 42a towards the +Y-axis direction side. The end on the −Y-axis direction side of the first fixed electrode-side wiring 51a is connected to the first fixed electrode-side fixing portion 21a through the first contact 54a (see FIG. 2). The end on the +Y-axis direction side of the first fixed electrode-side wiring 51a is drawn to the outside of the package 20 and is electrically connected to an external terminal (not illustrated). Similarly, the second fixed electrode-side wiring (not illustrated) is disposed to extend from the vicinity of the above-described second protrusion 42b towards the −Y-axis direction side. The end on the +Y-axis direction side of the second fixed electrode-side wiring is connected to the second fixed electrode-side fixing portion 21b through the second contact (not illustrated). The end on the −Y-axis direction side of the second fixed electrode-side wiring is drawn to the outside of the package 20 and is electrically connected to an external terminal (not illustrated).

The movable electrode-side wirings 52a and 52b are disposed so as to overlap as much as possible with the movable mass 32 of the sensor element 10, in plan view. The movable electrode-side wiring 52a is disposed on the +X-axis direction side with respect to the first fixed electrode-side wiring 51a and the second fixed electrode-side wiring (not illustrated). The movable electrode-side wiring 52b is disposed on the −X-axis direction side with respect to the first fixed electrode-side wiring 51a and the second fixed electrode-side wiring.

The movable electrode-side wiring 53 connects the movable electrode-side wiring 52a with the movable electrode-side wiring 52b. The movable electrode-side wiring 53 is connected to the second movable electrode-side fixing portion 31b through the fourth contact 55b. Similarly, although not shown, the movable electrode-side wiring 53 is connected to the first movable electrode-side fixing portion 31a through the third contact.

The constituent material of such a wiring pattern 5 is not particularly limited as long as it has conductivity, and various electrode materials can be used. For example, transparent electrode materials such as indium tin oxide (ITO) and zinc oxide (ZnO), metal materials such as gold (Au), gold alloy, platinum (Pt), aluminum (Al), aluminum alloy, silver (Ag), silver alloy, chromium (Cr), chromium alloy, copper (Cu), molybdenum (Mo), niobium (Nb), tungsten (W), iron (Fe), titanium (Ti), cobalt (Co), zinc (Zn), and zirconium (Zr), and semiconductor materials such as silicon (Si) can be used.

The wiring pattern 5 is collectively formed by forming a film by using the above-described materials by a vapor deposition method such as a sputtering method or an evaporation method and patterning the film by using a photolithography method, an etching method, or the like. In the case where the substrate 4 is made of a semiconductor material such as silicon, it is preferable to provide an insulating layer between the substrate 4 and the wiring pattern 5. As a constituent material of such an insulating layer, for example, silicon oxide ($SiO_2$), aluminum nitride (AlN), silicon nitride (SiN), or the like can be used.

In addition, the constituent material of each contact is not particularly limited as long as it has conductivity, and various electrode materials can be used similarly to the wiring pattern 5, and, for example, metal of a simple substance of metal such as Au, Pt, Ag, Cu, and Al, or a metal alloy containing any of these metals is preferably used. By configuring each contact using such a metal, the contact resistance between the wiring pattern 5 and the sensor element 10 can be reduced.

Cover Member

As illustrated in FIGS. 2 and 3, the cover member 6 (lid) has a function of protecting the above-described sensor element 10. The cover member 6 is bonded to the above-mentioned substrate 4, and forms a space S for accommodating the sensor element 10 between the substrate 4 and the cover member 6.

More specifically, the cover member 6 has a plate-like shape, and a recess 61 is provided on the lower surface (the surface on the side of the sensor element 10). The recess 61 is formed so as to allow displacement of the movable portion of the sensor element 10. A part outside the recess 61 on the lower surface of the cover member 6 (a periphery) is bonded to the upper surface of the above-described substrate 4. The method of bonding the cover member 6 and the substrate 4 is not particularly limited, and for example, a bonding method using an adhesive, an anodic bonding method, a direct bonding method, or the like can be used. In addition, the constituent material of the cover member 6 is not particularly limited as long as it can exhibit the above-described function. For example, a silicon material, a glass material, or the like can be suitably used.

According to the physical quantity sensor 1 as described above, the widths of the first extending arm 212a and the second extending arm 212b in the second direction (X-axis direction) are narrower at a distal end (width W2) away from the fixing anchors 211a and 211b in the first direction (Y-axis direction) than at a proximal end (width W1) connected to the fixing anchors 211a and 211b. This makes it possible to reduce (lighten) the mass of the first extending arm 212a and the second extending arm 212b, without reducing the strength of the connecting interface between the fixing anchors 211a and 211b and the first and second extending arms 212a and 212b. Further, since it is possible to reduce the mass of the tip ends of the first extending arm 212a and the second extending arm 212b that are away from the connecting interface with the fixing anchors 211a and 211b, it is possible to reduce the rotational moment in the first extending arm 212a and the second extending arm 212b. That is, while maintaining the robustness of the first extending arm 212a and the second extending arm 212b in the connecting interface with the fixing anchors 211a and 211b, it is possible to reduce stress occurring in the connecting interfaces between the fixing anchors 211a and 211b and the first and second extending arms 212a and 212b. This makes it possible to reduce the risk of breakage of the first extending arm 212a and the second extending arm 212b due to stress concentration occurring in the connecting interface between the fixing anchors 211a and 211b and the first and second extending arms 212a and 212b.

Further, in the physical quantity sensor 1, since each first movable electrode finger 3221a, each second movable electrode finger 3221b, each first fixed electrode finger 2131a, and each second fixed electrode finger 2131b extend along the X-axis direction orthogonal to the detection axis direction, it is possible to increase a change in each of the capacitances between the first fixed electrode 213a and the first movable electrode 322a, and between the second fixed electrode 213b and the second movable electrode 322b, due to the displacement of the movable mass 32. Therefore, it is possible to increase the sensitivity of the physical quantity sensor 1.

Further, since the first extending arm 212a and the second extending arm 212b extend along the Y-axis direction which is the detection axis direction, it is possible to efficiently increase the number of each of the first movable electrode finger 3221a, the second movable electrode finger 3221b, the first fixed electrode finger 2131a, and the second fixed electrode finger 2131b. Therefore, it is possible to further increase the change in each of the capacitances between the first fixed electrode 213a and the first movable electrode 322a, and between the second fixed electrode 213b and the second movable electrode 322b due to the displacement of the movable mass 32.

Second Embodiment

Figure 5:
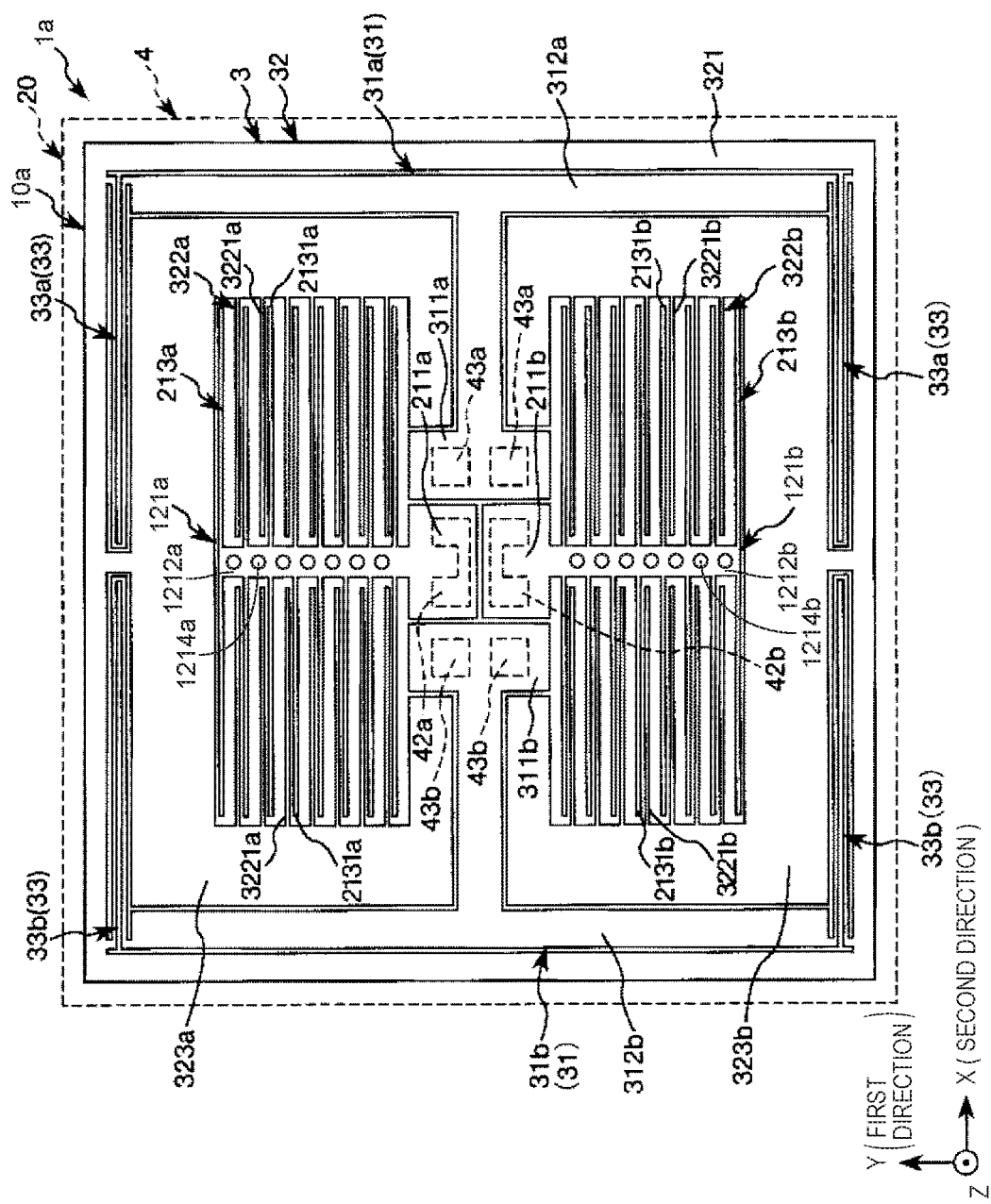
FIG. 5 is a plan view illustrating a physical quantity sensor according to a second embodiment of the invention.

A physical quantity sensor according to a second embodiment of the invention will be described below with reference to FIGS. 5 and 6. FIG. 5 is a plan view illustrating the physical quantity sensor according to the second embodiment of the invention, and FIG. 6 is a partial enlarged plan view for explaining a first fixed electrode and a first movable electrode included in the physical quantity sensor shown in FIG. 5.

In addition, the physical quantity sensor 1a according to the second embodiment includes a first extending arm 1212a and a second extending arm 1212b that are different in configuration from the first extending arm 212a and the second extending arm 212b of the physical quantity sensor 1 of the above-described first embodiment. In the following description, the first extending arm 1212a and the second extending arm 1212b having different configurations will be mainly described, and similar components are denoted by the same reference numerals, and description thereof will be omitted.

Figure 6:
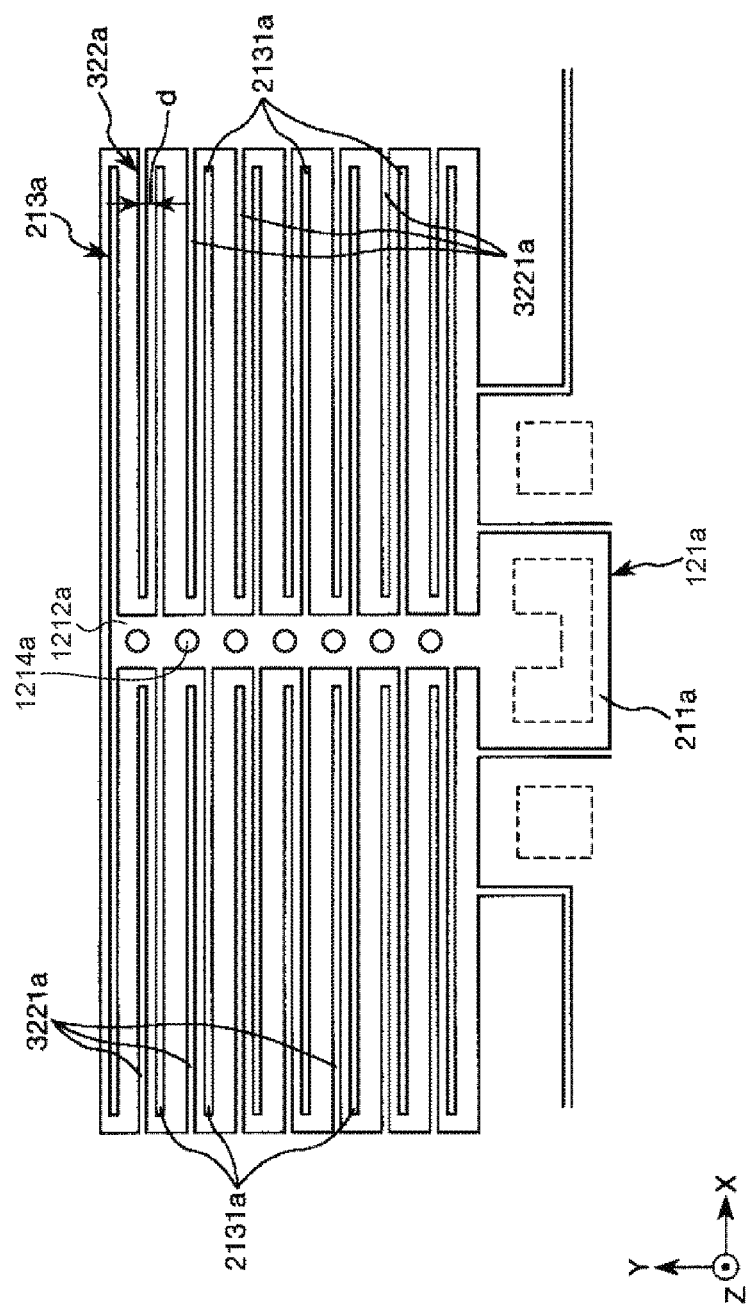
FIG. 6 is a partial enlarged plan view for explaining a first fixed electrode and a first movable electrode included in the physical quantity sensor shown in FIG. 5.

As illustrated in FIGS. 5 and 6, the physical quantity sensor 1 of the present embodiment includes a sensor element 10a, a substrate 4 as a base supporting the sensor element 10a, a wiring pattern 5 (see FIG. 2) electrically connected to the sensor element 10a on the substrate 4, and a cover member 6 (lid, see FIG. 2) bonded to the substrate 4 so as to cover the sensor element 10a. Here, the substrate 4 and the cover member 6 constitute the package 20 (see FIG. 2) forming the space S (see FIG. 2) accommodating the sensor element 10a.

Sensor Element

The sensor element 10a includes a first fixed electrode-side fixing portion 121a, a second fixed electrode-side fixing portion 121b, and a movable electrode-side fixing portion 31 which are fixed to the substrate 4, a movable mass 32 surrounding these electrode-side fixing portions in plan view, and an elastic interconnect 33 connecting the movable electrode-side fixing portion 31 and the movable mass 32. In addition, the first fixed electrode-side fixing portion 121a, the second fixed electrode-side fixing portion 121b, the movable electrode-side fixing portion 31, the movable mass 32, and the elastic interconnect 33 are disposed along the upper surface (the surface on a side at which the sensor element 10a is provided) as the main surface of the substrate 4, similar to the first embodiment. The sensor element 10a has a shape that is rotationally symmetrical in plan view, and has a symmetrical shape with respect to the X-axis direction and the Y-axis direction.

The first fixed electrode-side fixing portion 121a and the second fixed electrode-side fixing portion 121b are disposed side by side along the Y-axis direction. Here, the first fixed electrode-side fixing portion 121a is disposed on the +Y-axis direction side with respect to the center of the sensor element 10a, whereas the second fixed electrode-side fixing portion 121b is disposed on the −Y-axis direction side with respect to the center of the sensor element 10a.

The first fixed electrode-side fixing portion 121a includes a fixing anchor 211a connected to the substrate 4 through a first protrusion 42a, a first extending arm 1212a, which is a suspension beam, extending along the first direction (+Y-axis direction) from the fixing anchor 211a, and a first fixed electrode 213a connected to the first extending arm 1212a. The first fixed electrode 213a is configured with a plurality of first fixed electrode fingers 2131a, as fixed electrodes, one end of which is supported by a first extending arm 1212a (see FIG. 4). The plurality of first fixed electrode fingers 2131a extend along respective directions (+X-axis direction and −X-axis direction) of the second direction intersecting with the first direction from the first extending arm 1212a and are disposed side by side at intervals along the Y-axis direction to constitute a "first fixed electrode comb" of a comb teeth shape.

Similarly, the second fixed electrode-side fixing portion 121b includes a fixing anchor 211b connected to the substrate 4 through a second protrusion 42b, a second extending arm 1212b, which is a suspension beam, extending along the first direction (−Y-axis direction) from the fixing anchor 211b, and a second fixed electrode 213b connected to the second extending arm 1212b. The second fixed electrode 213b is configured with a plurality of second fixed electrode fingers 2131b which are disposed side by side along the Y-axis direction with respect to the above-described first fixed electrode 213a, and one end of which is supported by a second extending arm 1212b, as fixed electrodes. A plurality of second fixed electrode fingers 2131b extend along directions (+X-axis direction and −X-axis direction) of the second direction from the second extending arm 1212b and are disposed side by side at intervals along the Y-axis direction, and constitute a "second fixed electrode comb" of a comb teeth shape.

The first extending arm 1212a and the second extending arm 1212b which are suspension beams are formed to have substantially the same width from the root end connected to the fixing anchors 211a and 211b to the tip end that is apart (distant) in the first direction (Y axis direction). In the first extending arm 1212a and the second extending arm 1212b, a plurality (seven in this embodiment) of substantially circular through-holes 1214a and 1214b penetrating in the Z-axis direction are provided. By providing such through-holes 1214a and 1214b, it is possible to reduce (lighten) the mass of the first extending arm 1212a and the second extending arm 1212b, without reducing the strength of the connecting interface between the fixing anchors 211a and 211b and the first and second extending arms 1212a and 1212b.

According to the physical quantity sensor 1a as described above, since the plurality of through-holes 1214a are provided in the first extending arm 1212a and the plurality of through-holes 1214b are provided in the second extending arm 1212b, it is possible to reduce (lighten) the mass of the first extending arm 1212a and the second extending arm 1212b, without reducing the strength of the connecting interface between the fixing anchors 211a and 211b and the first and second extending arms 1212a and 1212b. That is, while maintaining the robustness of the first extending arm 1212a and the second extending arm 1212b in the connecting interface with the fixing anchors 211a and 211b, it is possible to reduce stress occurring in the connecting interfaces between the fixing anchors 211a and 211b and the first and second extending arms 1212a and 1212b. This makes it possible to reduce the risk of breakage of the first extending arm 1212a and the second extending arm 1212b due to stress concentration occurring in the connecting interface between the fixing anchors 211a and 211b and the first and second extending arms 1212a and 1212b.

In the second embodiment described above, although the configuration is exemplified where a plurality of substantially circular through-holes 1214a and 1214b are provided in the first extending arm 1212a and the second extending arm 1212b in order to reduce the mass of the first extending arm 1212a and the second extending arm 1212b, it is not limited to this. In order to reduce the mass of the first extending arm 1212a and the second extending arm 1212b, at least one of recesses and through-holes may be used. Further, the shape of each recess or through-hole can be an elliptical shape, a track shape, a rectangular shape, a combination thereof, and the shape thereof is not limited. It is also possible to reduce the mass of the first extending arm 1212a and the second extending arm 1212b by providing an elongated recess in the first extending arm 1212a and the second extending arm 1212b.

Figure 7:
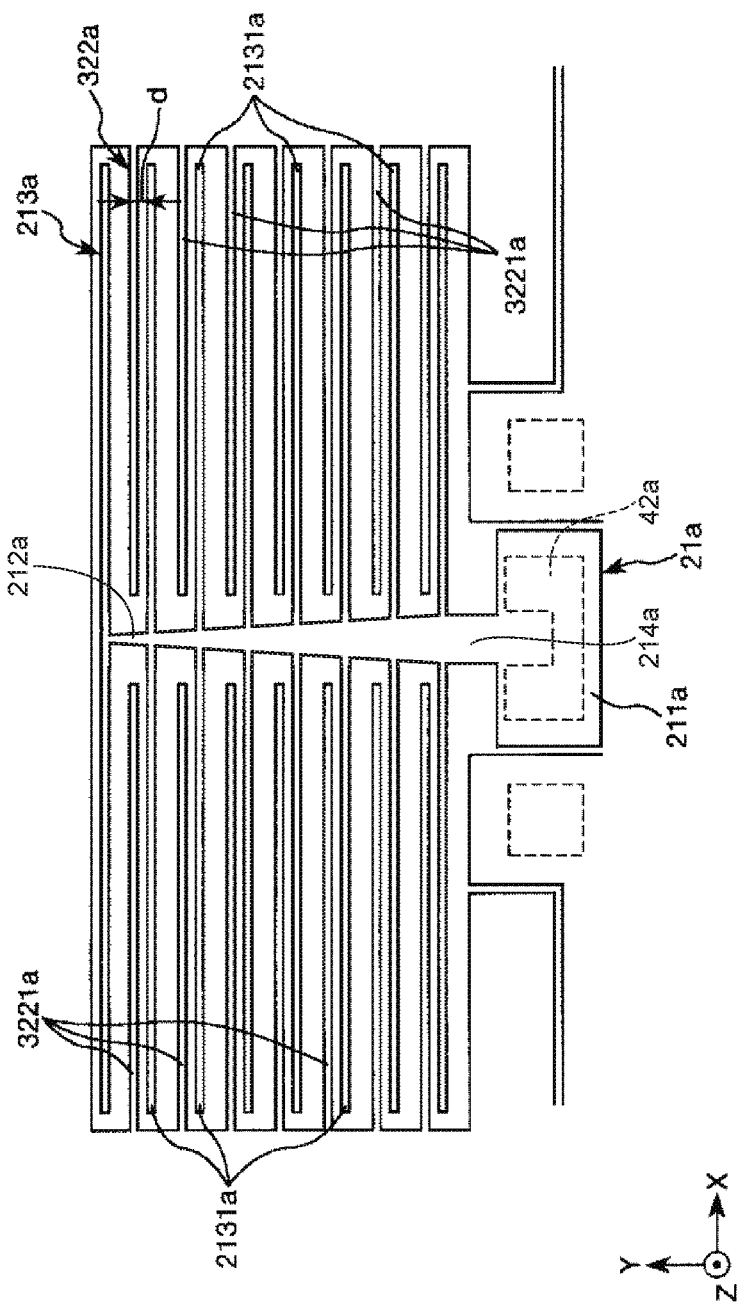
FIG. 7 is a plan view illustrating Modification Example 1 of the physical quantity sensors according to the first and second embodiments.
Figure 8:
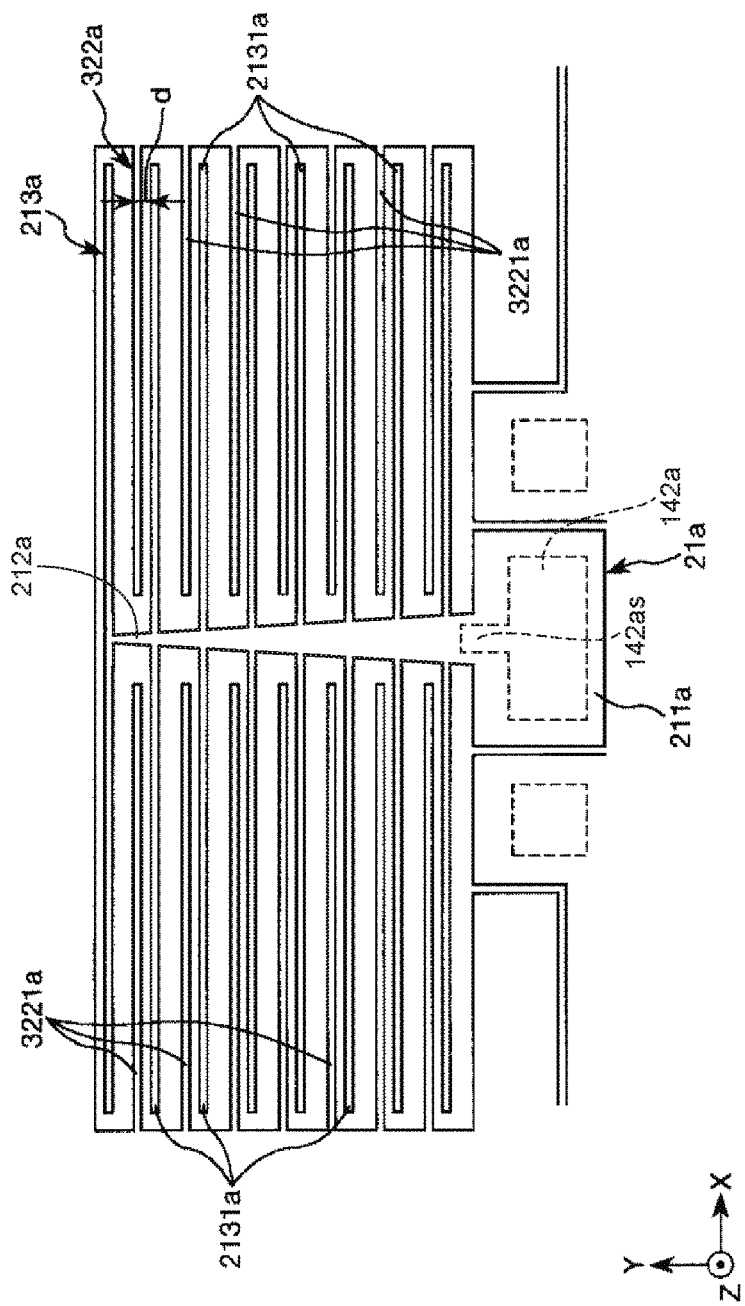
FIG. 8 is a plan view illustrating Modification Example 2 of the physical quantity sensors according to the first and second embodiments.
Figure 9:
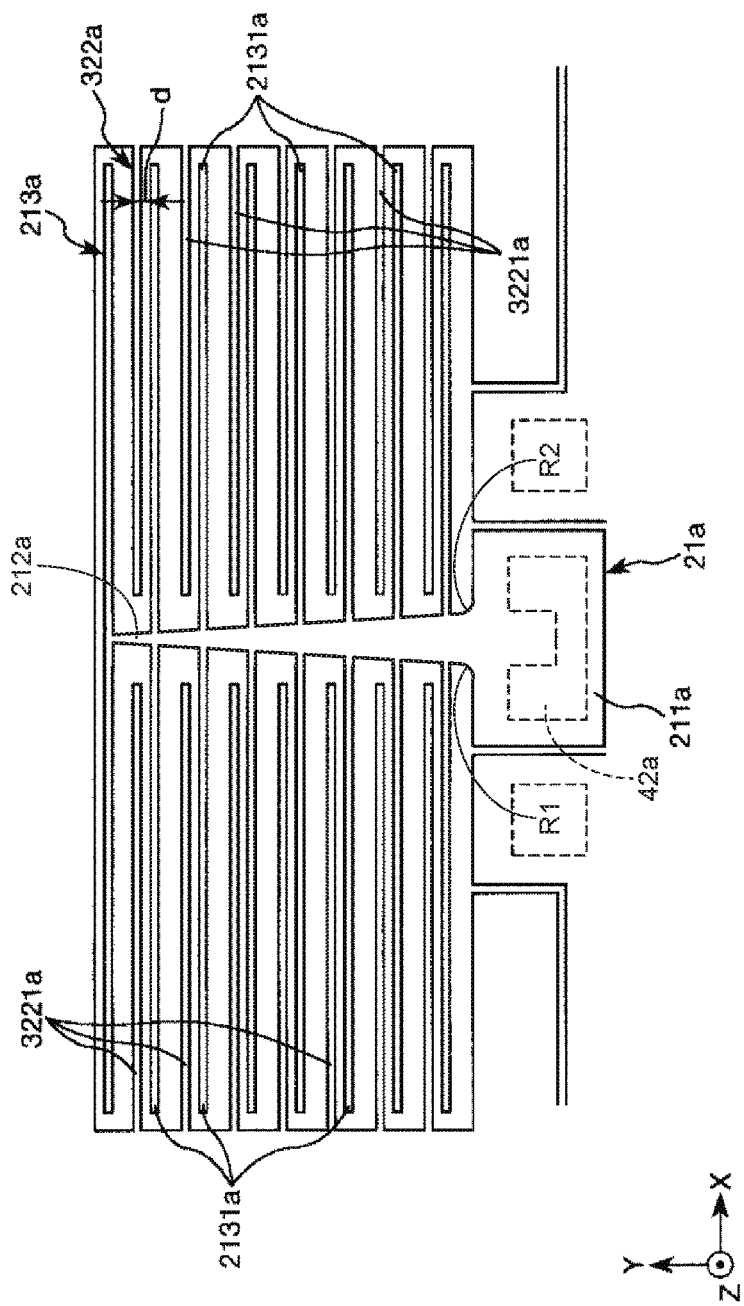
FIG. 9 is a plan view illustrating Modification Example 3 of the physical quantity sensors according to the first and second embodiments.

Modification Example of Physical Quantity Sensors According to First and Second Embodiments For the physical quantity sensors 1 and 1a according to the first and second embodiments, the following modification examples can be applied. Modification Example 1 to Modification Example 3 of the physical quantity sensors 1 and 1a according to the first and second embodiments will be described below with reference to FIGS. 7, 8, and 9. FIGS. 7, 8, and 9 illustrate modification examples of the physical quantity sensors according to the first and second embodiments, and FIG. 7, FIG. 8, and FIG. 9 are plan views illustrating Modification Example 1, Modification Example 2, and Modification Example 3, respectively.

Each of the following modification examples illustrates an example in which the connecting interfaces between the fixing anchors 211a and 211b and the first extending arms 212a and 1212a, and the second extending arms 212b and 1212b are different. In the following description, different parts of the configuration will be described, and description of other constituent parts will be omitted. Further, in FIG. 7, FIG. 8, and FIG. 9, the connecting interface between the fixing anchor 211a and the first extending arm 212a in the first embodiment is described as an example, but the same can apply to the connecting interface between the fixing anchor 211b and the second extending arm 212b, and the connecting interface between the fixing anchors 211a and 211b and the first and second extending arms 1212a and 1212b in the second embodiment.

Modification Example 1

In Modification Example 1, as shown in FIG. 7, the fixing anchor 211a has a connecting tab 214a (a constant width flange) extending over the main surface of the substrate 4 from the fixing anchor 211a and spaced apart from the main surface. The first extending arm 212a is connected to the fixing anchor 211a via the connecting tab 214a. According to the configuration of Modification Example 1, the connecting tab 214a allows the fixing anchor 211a and the first extending arm 212a to be connected while being spaced apart from each other, and thus it is possible to alleviate the impact propagated from the fixing anchor 211a to the first extending arm 212a. This makes it possible to reduce the risk of breakage of the first extending arm 212a.

Modification Example 2

In Modification Example 2, as shown in FIG. 8, in plan view from the +Z-axis direction, the fixing anchor 211a is provided so as to overlap (vertically align with) at least apart (a base region near the root end) of the first extending arm 212a. In the configuration example shown in FIG. 8, the fixing anchor 211a overlaps at least a part of the first extending arm 212a at the position of a projection 142 as protruding from the first protrusion 142a toward the side of the first extending arm 212a. According to the configuration of Modification Example 2, since the fixing anchor 211a overlaps at least a part of the first extending arm 212a in plan view from the +Z-axis direction, the placement area occupied by the fixing anchor 211a and the first extending arm 212a can be reduced.

Modification Example 3

In Modification Example 3, as shown in FIG. 9, two corner portions at which the fixing anchor 211a and the first extending arm 212a join each other form arcuate corners R1 and R2 (filets). In this way, by making the corner portions interconnecting the fixing anchor 211a and the first extending arm 212a to rounded shapes R1 and R2, it is possible to disperse the stress that is likely to be concentrated on the corner portions, thereby reducing the risk of breakage of the first extending arm 212a.

In addition, it is possible to disperse the stress which is likely to be concentrated on the corner portions, by providing for example, a linear chamfer such as a c-chamfer, although not shown, in the vicinity of the two corner portions where the fixing anchor 211a and the first extending arm 212a join, and making the two corner portions obtuse. Further, it is possible to use a linear portion such as the c chamfer and an arcuate R chamfer as in Modification Example 3, and the same effect can be obtained.

Third Embodiment

Figure 10:
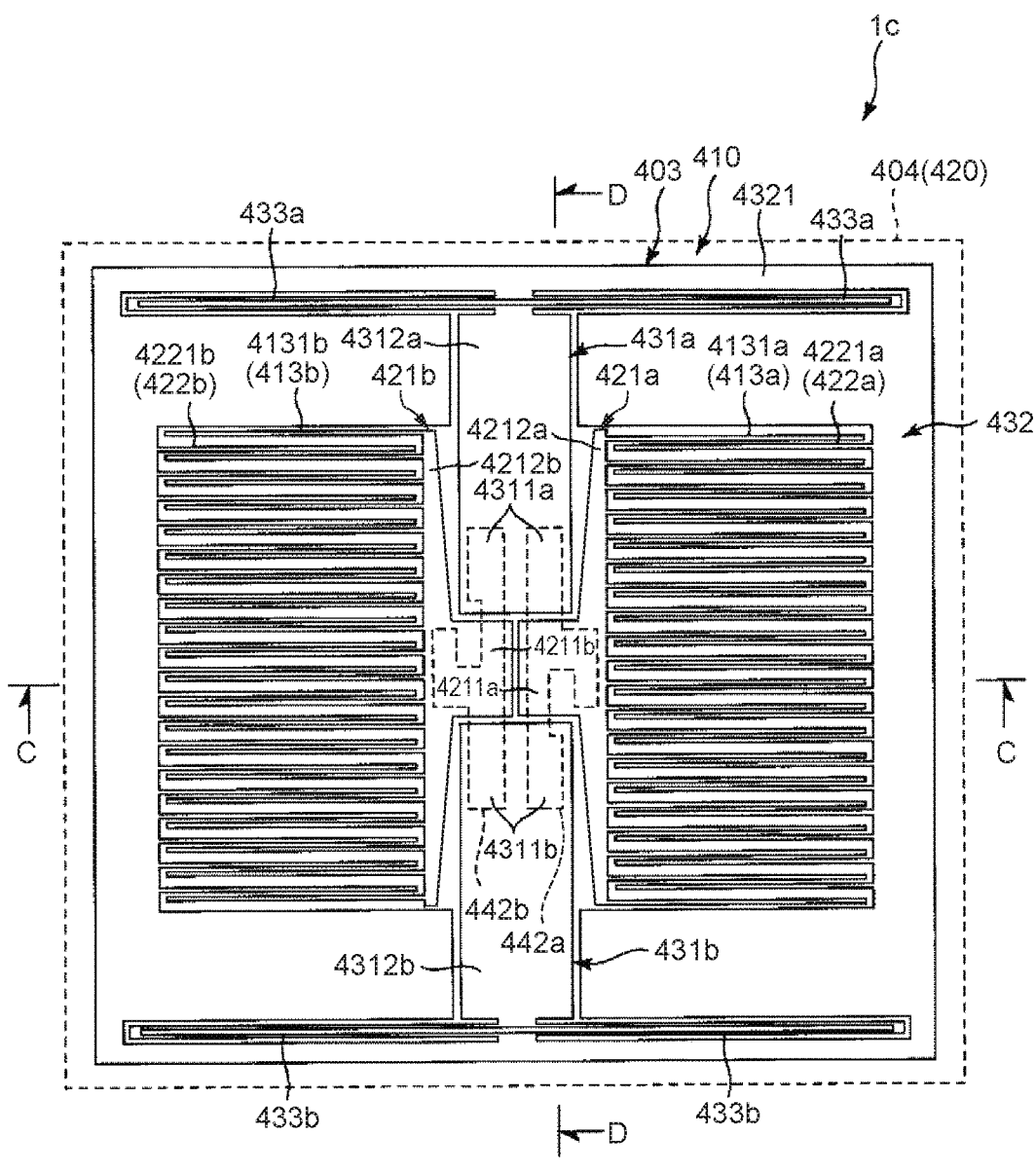
FIG. 10 is a plan view illustrating a physical quantity sensor according to a third embodiment of the invention.
Figure 11:
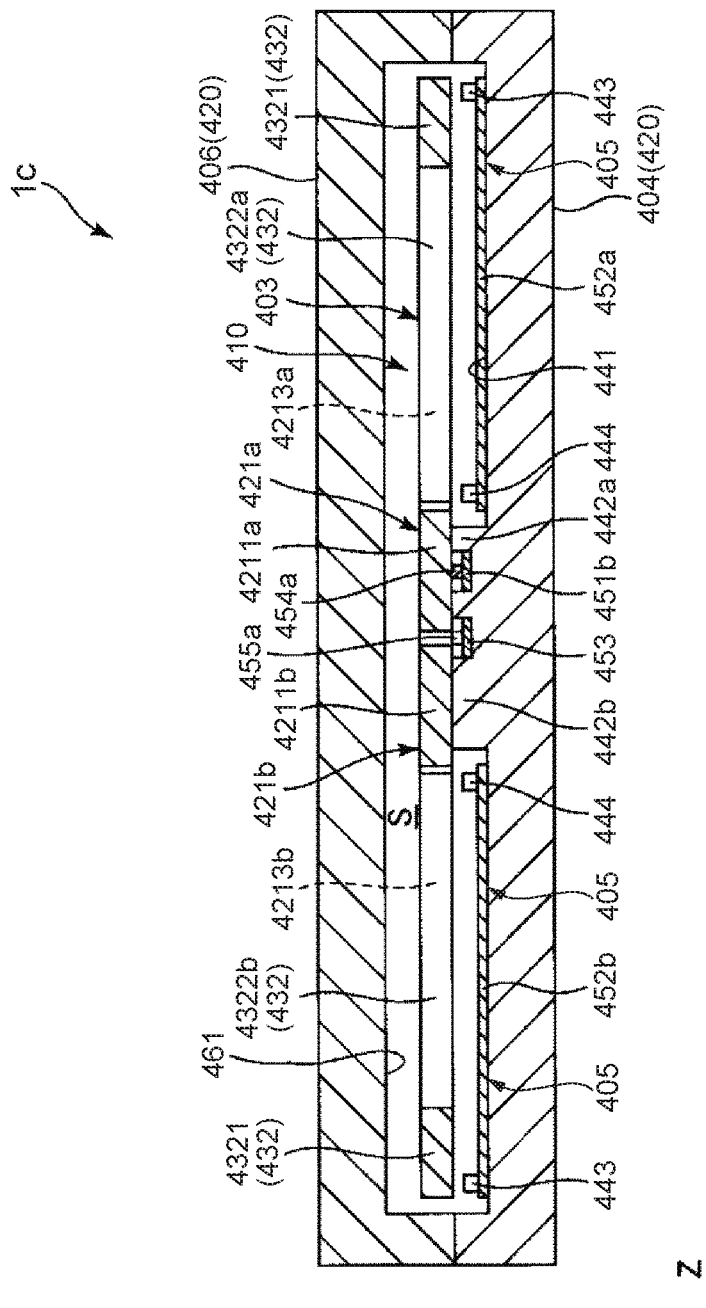
FIG. 11 is C-C line sectional view of FIG. 10.
Figure 12:
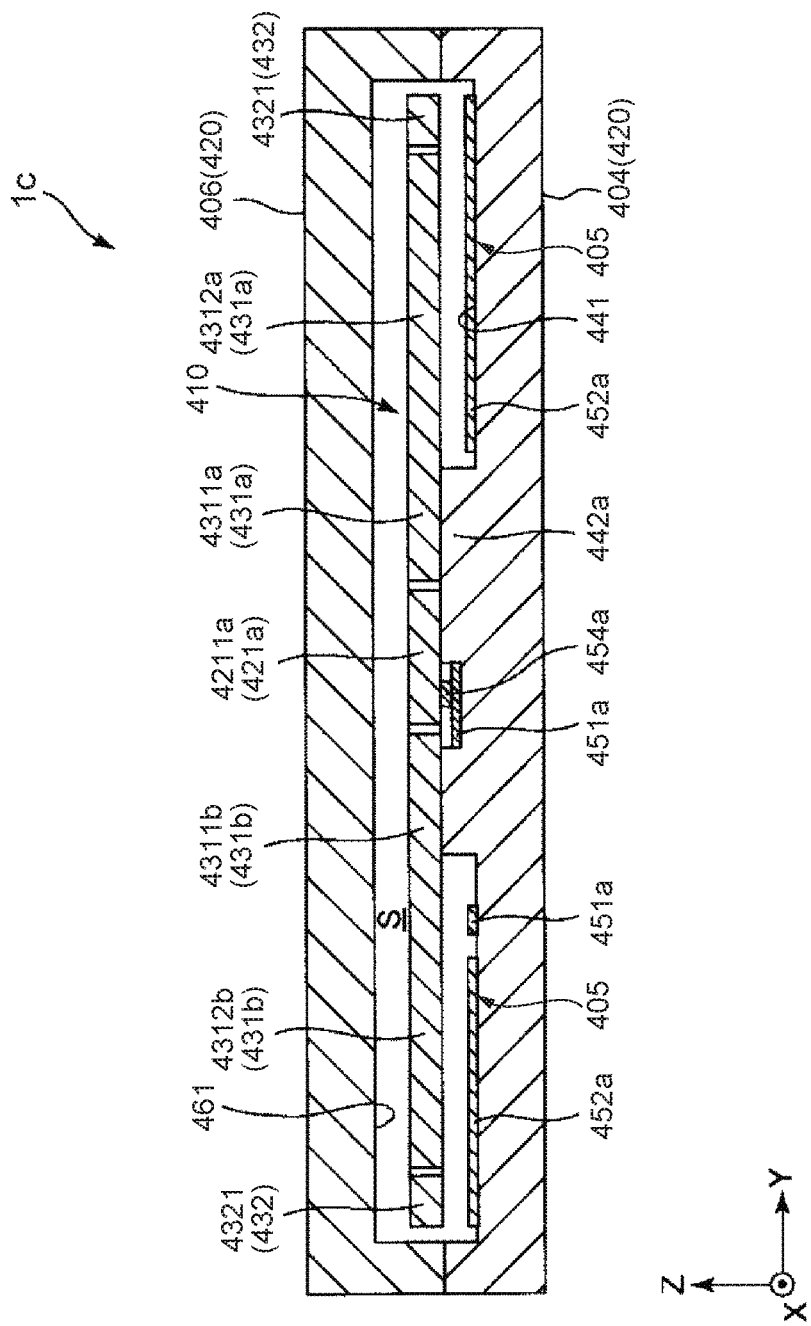
FIG. 12 is D-D line sectional view of FIG. 10.

FIG. 10 is a plan view illustrating a physical quantity sensor according to a third embodiment of the invention, FIG. 11 is C-C line sectional view of FIG. 10, and FIG. 12 is D-D line sectional view of FIG. 10. FIG. 12 is a partial enlarged plan view for explaining a first fixed electrode and a first movable electrode included in the physical quantity sensor shown in FIG. 10.

As illustrated in FIGS. 10, 11 and 12, the physical quantity sensor 1c of the present embodiment includes a sensor element 410, a substrate 404 as a base supporting the sensor element 410, a wiring pattern 405 electrically connected to the sensor element 410 on the substrate 404, and a cover member 406 (lid) bonded to the substrate 404 so as to cover the sensor element 410. Here, the substrate 404 and the cover member 406 constitute the package 420 forming the space S accommodating the sensor element 410. Each part of the physical quantity sensor 1c will be sequentially described below.
Sensor Element As illustrated in FIG. 10, the sensor element 410 includes a first fixed electrode-side fixing portion 421a, a second fixed electrode-side fixing portion 421b, a first movable electrode-side fixing portion 431a, and a second movable electrode-side fixing portion 431b which are fixed on the substrate 404, a movable mass 432 surrounding the electrode-side fixing portions in plan view, and two first elastic interconnects 433a and two second elastic interconnects 433b connecting the first movable electrode-side fixing portion 431a, the second movable electrode-side fixing portion 431b, and the movable mass 432. In addition, the first fixed electrode-side fixing portion 421a, the second fixed electrode-side fixing portion 421b, the first movable electrode-side fixing portion 431a, the second movable electrode-side fixing portion 431b, the movable mass 432, the first elastic interconnect 433a, and the second elastic interconnect 433b are disposed along the upper surface (the surface on which the sensor element 410 is provided) which is the main surface of the substrate 404, as illustrated in FIGS. 11 and 12.

Here, the first movable electrode-side fixing portion 431a, the second movable electrode-side fixing portion 431b, the movable mass 432, the two first elastic interconnects 433a, and the two second elastic interconnects 433b are integrally formed to constitute a movable electrode-side structure 403. That is, the sensor element 410 includes a first fixed electrode-side fixing portion 421a, a second fixed electrode-side fixing portion 421b, and a movable electrode-side structure 403 which are spaced apart from each other, and the movable electrode-side structure 403 includes a first movable electrode-side fixing portion 431a, a second movable electrode-side fixing portion 431b, a movable mass 432, a first elastic interconnect 433a, and a second elastic interconnect 433b which are integrally formed. Further, in the present embodiment, the sensor element 410 has a shape that is rotationally symmetrical in plan view.

The first fixed electrode-side fixing portion 421a and the second fixed electrode-side fixing portion 421b are disposed side by side along the X-axis direction. Here, the first fixed electrode-side fixing portion 421a is disposed on the +X-axis direction side with respect to the center of the sensor element 410, whereas the second fixed electrode-side fixing portion 421b is disposed on the −X-axis direction side with respect to the center of the sensor element 410.

The first fixed electrode-side fixing portion 421a includes a fixing anchor 4211a connected to the substrate 404 through a first protrusion 442a, a first extending arm 4212a, which is a suspension beam, extending along respective directions of the first direction (toward respective directions of +Y-axis direction and −Y-axis direction) sandwiching the fixing anchor 4211a from the fixing anchor 4211a and being spaced apart from the substrate 404, and a first fixed electrode 413a connected to the first extending arm 4212a. The first fixed electrode 413a is configured with a plurality of first fixed electrode fingers 4131a, as fixed electrodes, one end of which is supported by a first extending arm 4212a (see FIG. 13). The plurality of first fixed electrode fingers 4131a extend along the second direction (+X-axis direction) intersecting with the first direction from the first extending arm 4212a and are disposed side by side at intervals along the Y-axis direction to constitute a "first fixed electrode comb" of a comb teeth shape.

Similarly, the second fixed electrode-side fixing portion 421b includes a fixing anchor 4211b connected to the substrate 404 through a second protrusion 442b, second extending arms 4212b, which are suspension beams, extending along respective directions of the first direction (toward respective directions of +Y-axis direction and −Y-axis direction) from the fixing anchor 4211b and being spaced apart from the substrate 404, and a second fixed electrode 413b connected to the second extending arm 4212b. The second fixed electrode 413b is configured with a plurality of second fixed electrode fingers 4131b which are disposed side by side along the X-axis direction with respect to the above-described first fixed electrode 413a, and one end of which is supported by a second extending arm 4212b. The plurality of second fixed electrode fingers 4131b extend along the second direction (−X-axis direction) intersecting with the first direction from the second extending arm 4212b and are disposed side by side at intervals along the Y-axis direction to constitute a "second fixed electrode comb" of a comb teeth shape.

In this way, since the first extending arm 4212*a* and the second extending arm 4212*b* which are suspension beams extend from the fixing anchors 4211*a* and 4211*b* towards both directions (+Y-axis direction and −Y-axis direction) sandwiching the fixing anchors 4211*a* and 4211*b*, it is possible to increase the number of first fixed electrode fingers 4131*a* and second fixed electrode fingers 4131*b* which are provided in the first extending arm 4212*a* and the second extending arm 4212*b*, thereby improving the detection sensitivity.

The first extending arm 4212*a* and the second extending arm 4212*b* which are suspension beams are formed such that the widths of the tip ends (distal ends) that are apart (distant) from the fixing anchors 4211*a* and 4211*b* in the first direction (Y axis direction) are narrower than the widths in the second direction (X axis direction) of the root ends (proximal ends) connected to the fixing anchors 4211*a* and 4211*b*. This will be described in detail by exemplifying the first extending arm 4212*a* in FIG. 13. In addition, the first extending arm 4212*a* and the second extending arm 4212*b* are configured to be line symmetrical with respect to the Y axis. However, the configuration of the first extending arm 4212*a* will be described as a representative, and the description of the second extending arm 4212*b* will be omitted.

Figure 13:
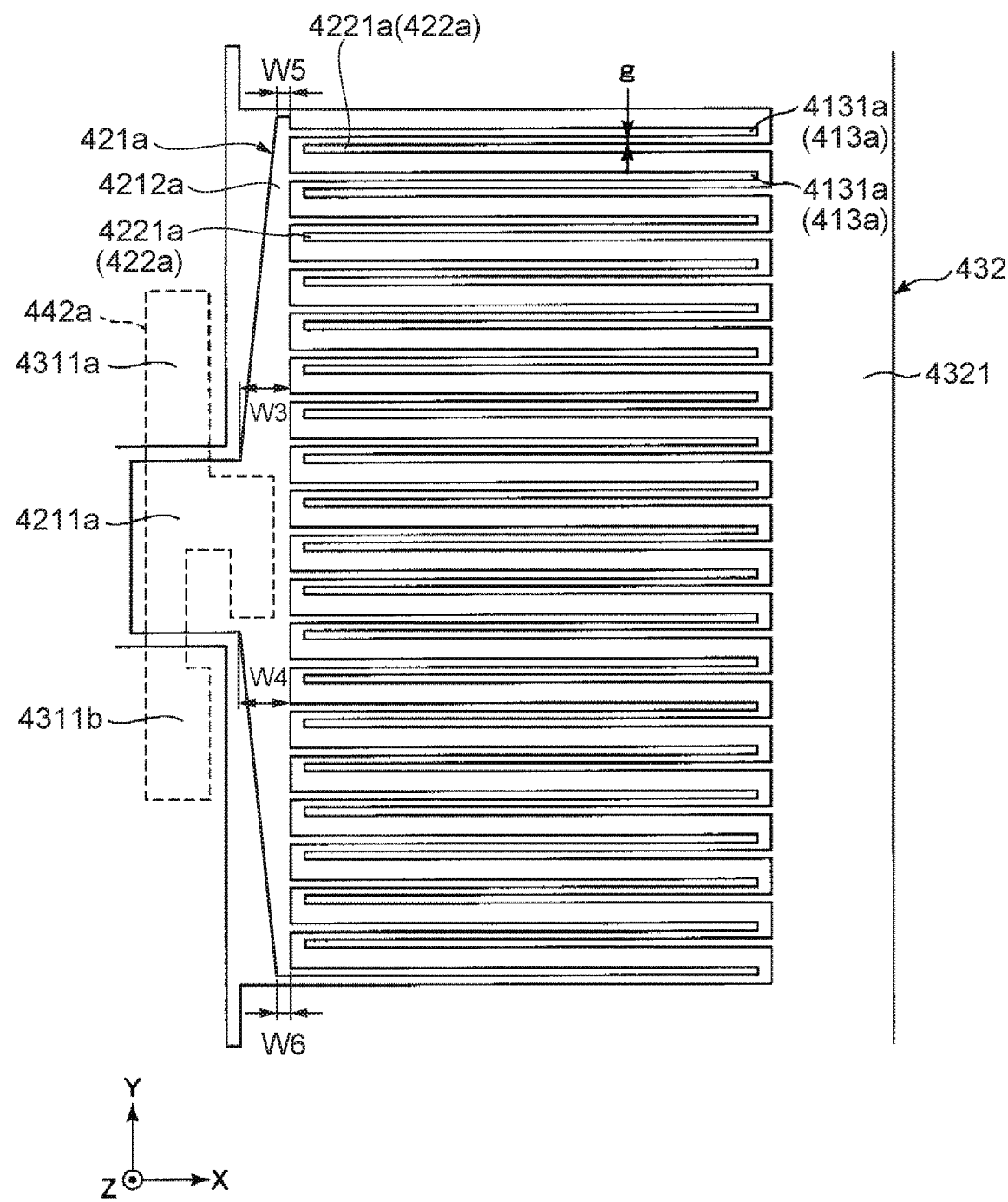
FIG. 13 is a partial enlarged plan view for explaining a first fixed electrode and a first movable electrode included in the physical quantity sensor shown in FIG. 10.

As illustrated in FIG. 13, one first extending arm 4212*a* extending in the +Y-axis direction is formed such that the width W5 of the tip end that is apart from the fixing anchor 4211*a* in the first direction (+Y axis direction) is narrower than the width W3 of the root end connected to the fixing anchor 4211*a* in the second direction (X axis direction). Similarly, the other first extending arm 4212*a* extending in the −Y-axis direction is formed such that the width W6 of the tip end that is apart from the fixing anchor 4211*a* in the first direction (−Y axis direction) is narrower than the width W4 in the second direction (X axis direction) of the root end connected to the fixing anchor 4211*a*.

The first extending arm 4212*a* of the present embodiment is formed such that the width in the second direction (X-axis direction) gradually decreases (one sided taper) from widths W3 and W4 to widths W5 and W6, from the root end connected to the fixing anchor 4211*a* toward respective directions of the first direction (respective directions of +Y-axis direction and −Y-axis direction) (towards the tip ends). Specifically, it is configured such that the edge on a side connected to the fixing anchor 4211*a* of the first extending arm 4212*a*, in plan view from the +Z-axis direction, is inclined inwardly from the fixing anchor 4211*a* toward respective directions of the first direction (respective directions of +Y-axis direction and −Y-axis direction). In the present embodiment, a configuration example is described in which the inclination of the edge of the first extending arm 4212*a* is provided on the side of the fixing anchor 4211*a*, but the inclination may be provided to at least one of the edge on the side of the fixing anchor 4211*a* of the first extending arm 4212*a* and the edge on the side opposite to the fixing anchor 4211*a* (the edge on the side to which the plurality of first fixed electrode fingers 4131*a* extends).

In this way, the width of the first extending arm 4212*a* gradually decreases from the root end connected to the fixing anchor 4211*a* toward the first direction, so that it is possible to reduce the mass of the first extending arm 4212*a*, prevent the occurrence of the stress concentration in the first extending arm 4212*a*, and further reduce the risk of breakage of the first extending arm 4212*a*.

In addition, it is preferable that the positions at which the first extending arm 4212*a* and the second extending arm 4212*b* are fixed to the fixing anchors 4211*a* and 4211*b* do not overlap with each other, in plan view from the +Z-axis direction. In this way, it is possible to distinguish between the first extending arm 4212*a* and the fixing anchor 4211*a*, and between the second extending arm 4212*b* and the fixing anchor 4211*b*, thereby reducing the influence of the variation in the fixed state and the like on the states of the first extending arm 4212*a* and the fixing anchor 4211*a*.

On the other hand, the first movable electrode-side fixing portion 431*a* and the second movable electrode-side fixing portion 431*b* are disposed side by side along the Y-axis direction crossing the X-axis direction. Here, the first movable electrode-side fixing portion 431*a* is disposed on the +Y-axis direction side with respect to the center of the sensor element 410, whereas the second movable electrode-side fixing portion 431*b* is disposed on the −Y-axis direction side with respect to the center of the sensor element 410. In the present embodiment, in plan view, the first movable electrode-side fixing portion 431*a* is disposed on the +Y-axis direction side and the second movable electrode-side fixing portion 431*b* is disposed on the −Y-axis direction side, with respect to the fixing anchors 4211*a* and 4211*b*. However, the first fixed electrode-side fixing portion 421*a* and the second fixed electrode-side fixing portion 421*b* have parts (connectors 4311*a* and 4311*b*) located between the first movable electrode-side fixing portion 431*a* and the second movable electrode-side fixing portion 431*b*, respectively, in plan view.

The first movable electrode-side fixing portion 431*a* has a connector 4311*a* connected to the substrate 404 and a first support 4312*a* extending along the +Y-axis direction from the connector 4311*a*. The width of the end on the +Y-axis direction side of the first support 4312*a* is narrow.

Similarly, the second movable electrode-side fixing portion 431*b* has a connector 4311*b* connected to the substrate 404 and a second support 4312*b* extending along the −Y-axis direction from the connector 4311*b*. The width of the end on the −Y-axis direction side of the second support 4312*b* is narrow.

The first fixed electrode-side fixing portion 421*a*, the second fixed electrode-side fixing portion 421*b*, the first movable electrode-side fixing portion 431*a*, and the second movable electrode-side fixing portion 431*b* are disposed inside the movable mass 432 having a frame shape in plan view. In other words, the movable mass 432 has a shape that surrounds the first fixed electrode-side fixing portion 421*a*, the second fixed electrode-side fixing portion 421*b*, the first movable electrode-side fixing portion 431*a*, and the second movable electrode-side fixing portion 431*b*, in plan view.

The movable mass 432 has a frame 4321 having a frame shape in plan view, and a first movable electrode 422*a* and a second movable electrode 422*b* connected to the frame 4321.

Here, the first movable electrode 422*a* has a part facing the above-described first fixed electrode 413*a*. Specifically, the first movable electrode 422*a* is supported at one end by the frame 4321, and is configured with first movable electrode fingers 4221*a* which are a plurality of movable electrodes disposed and extending to the inside of the frame 4321 so as to face the plurality of first fixed electrode fingers 4131*a* (first fixed electrode combs) of the first fixed electrode 413*a* at intervals g (see FIG. 13). The plurality of first movable electrode fingers 4221*a* extend along the −X-axis direction from the frame 4321 and are disposed side by side at intervals along the Y-axis direction to constitute a "first movable electrode comb" of a comb teeth shape.

Similarly, the second movable electrode 422b has a part facing the above-described second fixed electrode 413b. Specifically, the second movable electrode 422b is supported at one end by the frame 4321, and is configured with second movable electrode fingers 4221b which are a plurality of movable electrodes extending and disposing to the inside of the frame 4321 so as to face the plurality of second fixed electrode fingers 4131b of the above-described second fixed electrode 413b at intervals. The plurality of second movable electrode fingers 4221b extend along the +X-axis direction from the frame 4321 and are disposed side by side at intervals along the Y-axis direction to constitute a "second movable electrode comb" of a comb teeth shape.

In this way, the movable mass 432 is supported through two first elastic interconnects 433a with respect to the above-described first movable electrode-side fixing portion 431a, and is supported through two second elastic interconnects 433b with respect to the above-described second movable electrode-side fixing portion 431b. Therefore, not only the above-described first fixed electrode-side fixing portion 421a, the second fixed electrode-side fixing portion 421b, the first movable electrode-side fixing portion 431a, and the second movable electrode-side fixing portion 431b, but also two first elastic interconnects 433a and two second elastic interconnects 433b are disposed inside the movable mass 432 forming a frame shape, in plan view.

The two first elastic interconnects 433a respectively connect the first movable electrode-side fixing portion 431a and the movable mass 432 so that the movable mass 432 can be displaced in the Y axis direction. Similarly, the two second elastic interconnects 433b respectively connect the second movable electrode-side fixing portion 431b and the movable mass 432 so that the movable mass 432 can be displaced in the Y axis direction.

More specifically, two first elastic interconnects 433a each have a shape extending in the +Y-axis direction while meandering by stretching and folding along the X-axis direction so as to repeat approaching each other and separating from each other in the Y-axis direction, with respect to an end on the +Y-axis direction side of the first extending arm 4212a of the above-described first fixed electrode-side fixing portion 421a. That is, each first elastic interconnect 433a has a portion (beam) extending along the X-axis direction from an end on the +Y-axis direction side of the first support 4312a, a portion (beam) extending along the X-axis direction from the portion protruding to the inside of the frame 4321, and a portion (connecting portion) connecting the ends of these portions to each other.

Similarly, two second elastic interconnects 433b each have a shape extending in the −Y-axis direction while meandering so as to repeat approaching each other and separating from each other in the Y-axis direction, with respect to an end on the −Y-axis direction side of the second support 4312b of the above-described second fixed electrode-side fixing portion 421b.

In addition, the shapes of the first elastic interconnect 433a and the second elastic interconnect 433b are not limited to the above-described shapes as long as the movable mass 432 can be displaced in the Y-axis direction. For example, they may be configured with a single beam extending along the X-axis direction, or may be configured with three or more beams and two or more connecting portions connecting these beams to each other.

It is preferable that as the constituent materials of the first fixed electrode-side fixing portion 421a, the second fixed electrode-side fixing portion 421b, and the movable electrode-side structure 403 as described above, without being limited particularly, for example, a silicon material (single crystal silicon, polysilicon or the like) to which conductivity is imparted by doping an impurity such as phosphorus or boron is used.

Further, the first fixed electrode-side fixing portion 421a, the second fixed electrode-side fixing portion 421b, and the movable electrode-side structure 403 can be collectively formed by etching a single substrate (for example, a silicon substrate). In this case, the thickness of each portion of the sensor element 410 can be easily and highly accurately aligned. In addition, silicon can be processed with high precision by etching.

In the sensor element 410 configured as described above, when the sensor element 410 receives the acceleration in the Y-axis direction which is the detection axis direction, the movable mass 432 is displaced in the Y-axis direction with elastic deformation of the first elastic interconnect 433a and the second elastic interconnect 433b. Then, the distance between the first fixed electrode finger 4131a of the first fixed electrode 413a and the first movable electrode finger 4221a of the first movable electrode 422a, and the distance between the second fixed electrode finger 4131b of the second fixed electrode 413b and the second movable electrode finger 4221b of the second movable electrode 422b change respectively.

Therefore, the magnitude of the acceleration received by the sensor element 410 can be measured based on the capacitance therebetween. In the present embodiment, with respect to the distance between the first fixed electrode finger 4131a and the first movable electrode finger 4221a, and the distance between the second fixed electrode finger 4131b and the second movable electrode finger 4221b, if one distance thereof becomes large, the other distance becomes small. Therefore, with respect to the capacitance between the first fixed electrode finger 4131a and the first movable electrode finger 4221a, and the capacitance between the second fixed electrode finger 4131b and the second movable electrode finger 4221b, if capacitance on one side thereof becomes large, the capacitance on the other side becomes small. Therefore, differential operation is performed on a signal based on the capacitance between the first fixed electrode finger 4131a of the first fixed electrode 413a and the first movable electrode finger 4221a of the first movable electrode 422a, and a signal based on the capacitance between the second fixed electrode finger 4131b of the second fixed electrode 413b and the second movable electrode finger 4221b of the second movable electrode 422b. Thus, it is possible to remove a signal component due to the displacement of the movable mass 432 other than the detection axis direction, thereby reducing noise and outputting a signal corresponding to the acceleration received by the sensor element 410.

Substrate

The substrate 404 as a base has a plate shape, and is disposed along an XY plane (reference plane) which is a plane including an X axis and a Y axis. As illustrated in FIGS. 11 and 12, a recess 441 is provided on the upper surface (the surface on which the sensor element 410 is provided) which is the main surface of the substrate 404. The recess 441 has a function of preventing the movable portions (portions other than the fixing anchors 4211a and 4211b, and the connectors 4311a and 4311b, described above) of the sensor element 410 from contacting the substrate 404. Thus, the substrate 404 can support the sensor element 410 while allowing the sensor element 410 to be driven.

Further, on the upper surface of the substrate 404, a first protrusion 442a, a second protrusion 442b, four protrusions 443, and four protrusions 444 protruding from the bottom surface of the recess 441 are provided.

The first protrusion 442a and the second protrusion 442b have a function of supporting the sensor element 410 in a state where the movable portion of the sensor element 410 is floated on the substrate 404.

More specifically, the first protrusion 442a and the second protrusion 442b are disposed side by side along the X-axis direction. Here, the first protrusion 442a is disposed on the +X-axis direction side with respect to the center of the sensor element 410, whereas the second protrusion 442b is disposed on the −X-axis direction side with respect to the center of the sensor element 410. The first protrusion 442a and the second protrusion 442b extend along the Y-axis direction, respectively.

A fixing anchor 4211a of the above-described first fixed electrode-side fixing portion 421a is bonded to a central portion of the first protrusion 442a in the Y-axis direction. On the other hand, a fixing anchor 4211b of the above-described second fixed electrode-side fixing portion 421b is bonded to a central portion of the second protrusion 442b in the Y-axis direction.

Further, the connector 4311a of the above-described first movable electrode-side fixing portion 431a is bonded to the ends of the first protrusion 442a and the second protrusion 442b in the +Y-axis direction. On the other hand, the connector 4311b of the above-described second movable electrode-side fixing portion 431b is bonded to the ends of the first protrusion 442a and the second protrusion 442b in the −Y-axis direction.

The four protrusions 443 and the four protrusions 444 have a function of preventing the floating portion (in particular, the movable mass 432) of the sensor element 410 from sticking to the substrate 404.

More specifically, the four protrusions 443 are disposed at positions overlapping with the outer peripheral portion (more specifically, four corner portions of the frame 4321 having a quadrangular outline in plan view) of the above-described movable mass 432 in plan view. This can effectively reduce the sticking of the movable mass 432 to the substrate 404.

In addition, the four protrusions 444 are disposed at positions which are in the vicinity of a portion (a portion to which a large electric field is applied during anodic bonding) where the upper surface of the substrate 404 is exposed from the wiring pattern 405, which will be described later, in plan view and overlaps with the movable mass 432. This can effectively reduce the sticking of the movable mass 432 to the substrate 404.

As the constituent material of the substrate 404, although not particularly limited, it is preferable to use a substrate material having insulating properties, specifically, it is preferable to use a quartz substrate, a sapphire substrate, or a glass substrate, and in particular, it is preferable to use a glass material (for example, borosilicate glass such as Pyrex (registered trademark) glass) containing alkali metal ions (mobile ions). Thus, in a case where the sensor element 410 and the cover member 406 are made of silicon as a main material, they can be anodically bonded to the substrate 404.

In the drawing, the substrate 404 is formed of one member, but may be formed by bonding two or more members. For example, the substrate 404 may be formed by bonding the frame-like member and the plate-like member to each other. Further, the substrate 404 can be formed by using, for example, a photolithography method and an etching method.

Wiring Pattern

The wiring pattern 405 is provided on the upper surface of the above-described substrate 404. The wiring pattern 405 has a first fixed electrode-side wiring 451a electrically connected to the above-described first fixed electrode-side fixing portion 421a, a second fixed electrode-side wiring 451b electrically connected to the second fixed electrode-side fixing portion 421b, and movable electrode-side wirings 452a, 452b, and 453 electrically connected to the first movable electrode-side fixing portion 431a and the second movable electrode-side fixing portion 431b.

The first fixed electrode-side wiring 451a (see FIG. 12) is disposed to extend from the vicinity of the above-described first protrusion 442a towards the −Y-axis direction side. The end on the +Y-axis direction side of the first fixed electrode-side wiring 451a is connected to the first fixed electrode-side fixing portion 421a through the first contact 454a. The end on the +Y-axis direction side of the first fixed electrode-side wiring 451a is drawn to the outside of the package 420 and is electrically connected to an external terminal (not illustrated). Similarly, the second fixed electrode-side wiring 451b (see FIG. 11) is disposed to extend from the vicinity of the above-described second protrusion 442b towards the +Y-axis direction side. The end on the −Y-axis direction side of the second fixed electrode-side wiring 451b is connected to the second fixed electrode-side fixing portion 421b through the second contact (not illustrated). The end on the +Y-axis direction side of the second fixed electrode-side wiring 451b is drawn to the outside of the package 420 and is electrically connected to an external terminal (not illustrated). Here, it can also be said that the portion connected to the first contact 454a of the first fixed electrode-side fixing portion 421a constitutes a part of the fixing anchor 4211a connected to the substrate 404 of the above-described first fixed electrode-side fixing portion 421a. Similarly, it can also be said that the portion connected to the second contact (not illustrated) of the second fixed electrode-side fixing portion 421b constitutes a part of the fixing anchor 4211b connected to the substrate 404 of the above-described second fixed electrode-side fixing portion 421b.

The movable electrode-side wiring 452a is disposed on the +X-axis direction side with respect to the first protrusion 442a so as to overlap as much as possible with the portion (particularly, the movable mass 432) on the +X-axis direction side of the sensor element 410, in plan view. Similarly, the movable electrode-side wiring 452b is disposed on the −X-axis direction side with respect to the second protrusion 442b so as to overlap as much as possible with the portion (particularly, the movable mass 432) on the −X-axis direction side of the sensor element 410, in plan view.

The movable electrode-side wiring 453 connects the movable electrode-side wiring 452a with the movable electrode-side wiring 452b. The movable electrode-side wiring 453 is connected to the first movable electrode-side fixing portion 431a through the third contact 455a, and is connected to the second movable electrode-side fixing portion 431b through the fourth contact (not shown). Here, it can also be said that the portion connected to the third contact 455a of the first movable electrode-side fixing portion 431a constitutes a part of the connector 4311a connected to the substrate 404 of the above-described first movable electrode-side fixing portion 431a. Similarly, it can also be said that the portion connected to the fourth contact of the second movable electrode-side fixing portion 431b constitutes a part of the connector 4311b connected to the substrate 404 of the above-described second movable electrode-side fixing portion 431b.

The constituent material of the wiring pattern 405 is not particularly limited as long as it has conductivity, and various electrode materials similar to those of the first embodiment described above can be used.

Further, the wiring pattern 405 is collectively formed by forming a film by using the above-described materials by a vapor deposition method such as a sputtering method or an evaporation method and patterning the film by using a photolithography method, an etching method, or the like. In the case where the substrate 404 is made of a semiconductor material such as silicon, it is preferable to provide an insulating layer between the substrate 404 and the wiring pattern 405. As a constituent material of such an insulating layer, for example, silicon oxide ($SiO_2$), aluminum nitride (AlN), silicon nitride (SiN), or the like can be used.

In addition, the constituent material of each contact is not particularly limited as long as it has conductivity, and various electrode materials similar to those of the wiring pattern 405 and similar to those of the first embodiment described above can be used.

Cover Member

The cover member 406 (lid) has a function of protecting the above-described sensor element 410. The cover member 406 is bonded to the above-mentioned substrate 404, and forms a space S for accommodating the sensor element 410 between the substrate 404 and the cover member 406.

More specifically, the cover member 406 has a plate-like shape, and a recess 461 is provided on the lower surface (the surface on the side of the sensor element 410). The recess 461 is formed so as to allow displacement of the movable portion of the sensor element 410. A part (periphery) outside the recess 461 on the lower surface of the cover member 406 is bonded to the upper surface of the above-described substrate 404. The method of bonding the cover member 406 and the substrate 404 is not particularly limited, and for example, a bonding method using an adhesive, an anodic bonding method, a direct bonding method, or the like can be used. In addition, the constituent material of the cover member 406 is not particularly limited as long as it can exhibit the above-described function. For example, a silicon material, a glass material, or the like can be suitably used.

According to the physical quantity sensor 1c as described above, the widths of the first extending arm 4212a and the second extending arm 4212b in the second direction (X-axis direction) are narrower in portions (widths W5 and W6) away from the fixing anchors 4211a and 4211b in the first direction (Y-axis direction) than portions (widths W3 and W4) connected to the fixing anchors 4211a and 4211b. This makes it possible to reduce (lighten) the mass of the first extending arm 4212a and the second extending arm 4212b, without reducing the strength of the connecting interface between the fixing anchors 4211a and 4211b and the first and second extending arms 4212a and 4212b. That is, while maintaining the robustness of the first extending arm 4212a and the second extending arm 4212b in the connecting interface with the fixing anchors 4211a and 4211b, it is possible to reduce stress occurring in the connecting interfaces between the fixing anchors 4211a and 4211b and the first and second extending arms 4212a and 4212b. This makes it possible to reduce the risk of breakage of the first extending arm 4212a and the second extending arm 4212b due to stress concentration occurring in the connecting interface between the fixing anchors 4211a and 4211b and the first and second extending arms 4212a and 4212b.

Further, in the physical quantity sensor 1c, since each first movable electrode finger 4221a, each second movable electrode finger 4221b, each first fixed electrode finger 4131a, and each second fixed electrode finger 4131b extend along the X-axis direction orthogonal to the detection axis direction, it is possible to increase the change in each of the capacitances between the first fixed electrode 413a and the first movable electrode 422a, and between the second fixed electrode 413b and the second movable electrode 422b, due to the displacement of the movable mass 432. Therefore, it is possible to increase the sensitivity of the physical quantity sensor 1c.

Further, since the first extending arm 4212a and the second extending arm 4212b extend along the Y-axis direction which is the detection axis direction, it is possible to efficiently increase the number of each of the first movable electrode finger 4221a, the second movable electrode finger 4221b, the first fixed electrode finger 4131a, and the second fixed electrode finger 4131b. Therefore, it is possible to further increase the changes in capacitances between the first fixed electrode 413a and the first movable electrode 422a, and between the second fixed electrode 413b and the second movable electrode 422b due to the displacement of the movable mass 432.

Fourth Embodiment

Figure 14:
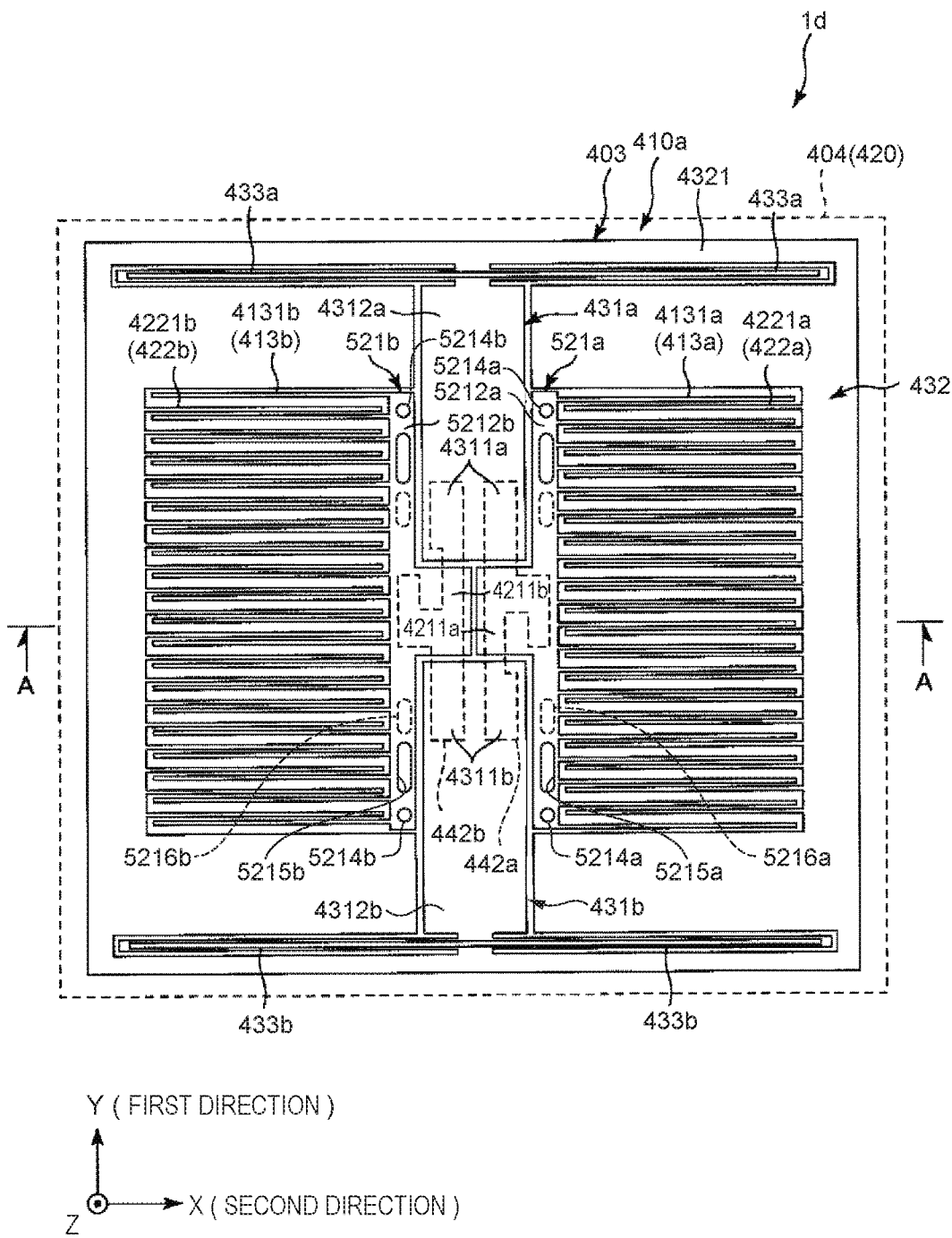
FIG. 14 is a plan view illustrating a physical quantity sensor according to a fourth embodiment of the invention.

A physical quantity sensor according to a fourth embodiment of the invention will be described below with reference to FIGS. 14 and 15. FIG. 14 is a plan view illustrating the physical quantity sensor according to the fourth embodiment of the invention, and FIG. 15 is a partial enlarged plan view for explaining a first fixed electrode and a first movable electrode included in the physical quantity sensor shown in FIG. 14.

In addition, the physical quantity sensor 1d according to the fourth embodiment includes a first extending arm 5212a and a second extending arm 5212b different in configuration from the first extending arm 4212a and the second extending arm 4212b of the physical quantity sensor 1c of the above-described third embodiment. In the following description, the first extending arms 5212a and the second extending arms 5212b having different configurations will be mainly described, and similar components are denoted by the same reference numerals, and description thereof will be omitted.

Figure 15:
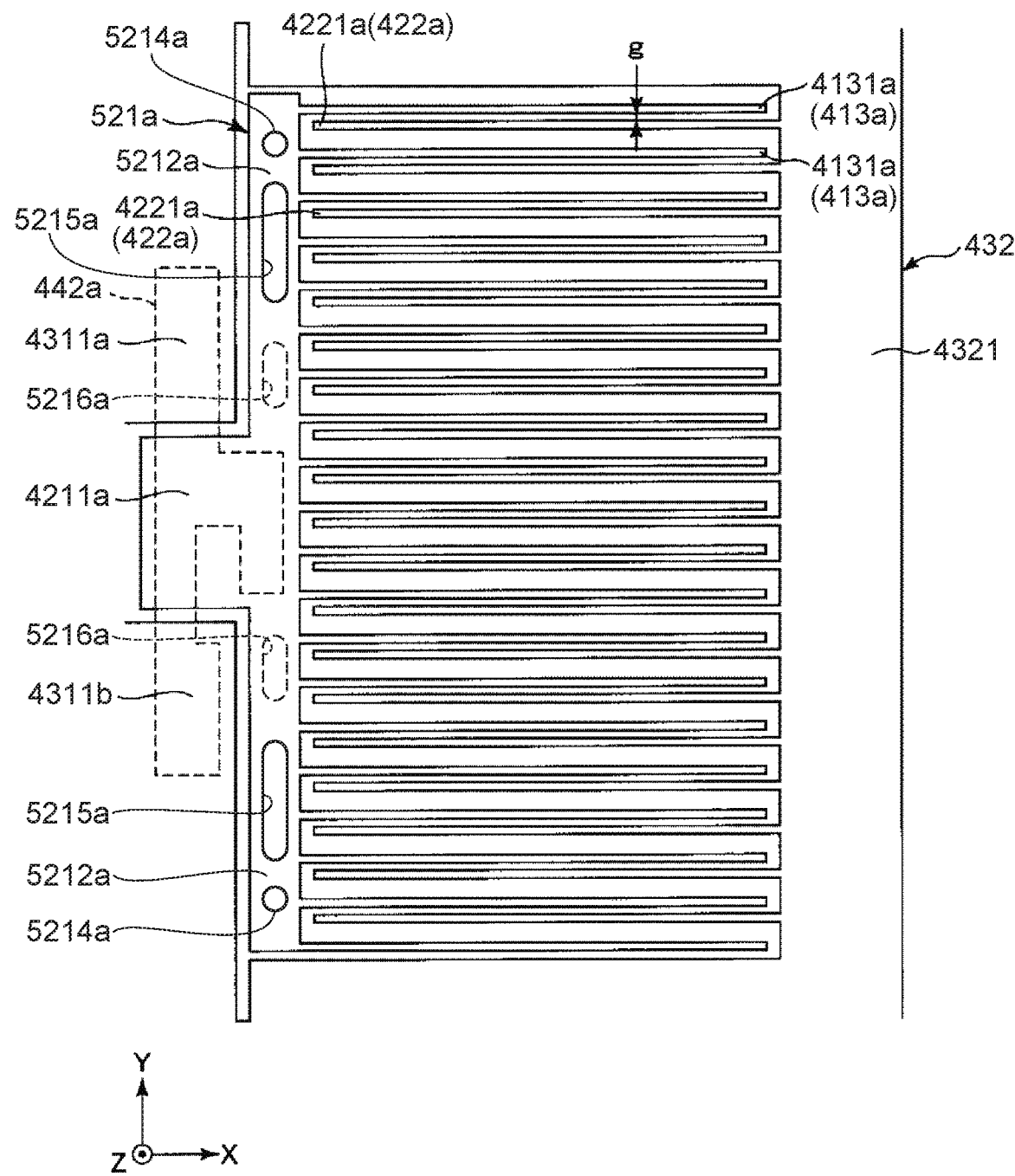
FIG. 15 is a partial enlarged plan view for explaining a first fixed electrode and a first movable electrode included in the physical quantity sensor shown in FIG. 14.

As illustrated in FIGS. 14 and 15, the physical quantity sensor 1d of the present embodiment includes a sensor element 410a, a substrate 404 as a base supporting the sensor element 410a, a wiring pattern 405 (see FIG. 11) electrically connected to the sensor element 410a on the substrate 404, and a cover member 406 (lid, see FIG. 11) bonded to the substrate 404 so as to cover the sensor element 410a. Here, the substrate 404 and the cover member 406 constitute the package 420 (see FIG. 11) forming the space S (see FIG. 11) accommodating the sensor element 410a.

Sensor Element

The sensor element 410a includes a first fixed electrode-side fixing portion 521a, a second fixed electrode-side fixing portion 521b, a first movable electrode-side fixing portion 431a, and a second movable electrode-side fixing portion 431b which are fixed on the substrate 404, a movable mass 432 surrounding the electrode-side fixing portions in plan view, and two first elastic interconnects 433a and two second elastic interconnects 433b connecting the first movable electrode-side fixing portion 431a, the second movable electrode-side fixing portion 431b, and the movable mass 432. In addition, the first fixed electrode-side fixing portion 521a, the second fixed electrode-side fixing portion 521b, the first movable electrode-side fixing portion 431a, the second movable electrode-side fixing portion 431b, the movable mass 432, the first elastic interconnect 433a, and the second elastic interconnect 433b are disposed along the upper surface (the surface on which the sensor element 410a is provided) which is the main surface of the substrate 404, similar to the third embodiment. The sensor element 410a has a shape that is rotationally symmetrical in plan view, and has a symmetrical shape with respect to the X-axis direction and the Y-axis direction.

The first fixed electrode-side fixing portion 521a and the second fixed electrode-side fixing portion 521b are disposed side by side along the X-axis direction. Here, the first fixed electrode-side fixing portion 521a is disposed on the +X-axis direction side with respect to the center of the sensor element 410a, whereas the second fixed electrode-side fixing portion 521b is disposed on the −X-axis direction side with respect to the center of the sensor element 410a.

The first fixed electrode-side fixing portion 521a includes a fixing anchor 4211a connected to the substrate 404 through a first protrusion 442a, a first extending arms 5212a, which are suspension beams, extending towards both directions (+Y-axis direction and −Y-axis direction) along the first direction from the fixing anchor 4211a, and a first fixed electrode 413a connected to the first extending arm 5212a. The first fixed electrode 413a is configured with a plurality of first fixed electrode fingers 4131a, as fixed electrodes, one end of which is supported by a first extending arm 5212a (see FIG. 15). The plurality of first fixed electrode fingers 4131a extend along the second direction (+X-axis direction) intersecting with the first direction from the first extending arm 5212a and are disposed side by side at intervals along the Y-axis direction to constitute a "first fixed electrode comb" of a comb teeth shape.

Similarly, the second fixed electrode-side fixing portion 521b includes a fixing anchor 4211b connected to the substrate 404 through a second protrusion 442b, a second extending arm 5212b, which is a suspension beam, extending towards both directions (+Y-axis direction and −Y-axis direction) along the first direction from the fixing anchor 4211b, and a second fixed electrode 413b connected to the second extending arm 5212b. The second fixed electrode 413b is configured with a plurality of second fixed electrode fingers 4131b which are disposed side by side along the X-axis direction with respect to the above-described first fixed electrode 413a, and one end of which is supported by a second extending arm 5212b, as fixed electrodes. The plurality of second fixed electrode fingers 4131b extend along the second direction (−X-axis direction) from the second extending arm 5212b and are disposed side by side at intervals along the Y-axis direction to constitute a "second fixed electrode comb" of a comb teeth shape.

The first extending arm 5212a and the second extending arm 5212b which are suspension beams are formed to have substantially the same width, from the portions connected to the fixing anchors 4211a and 4211b to the tip ends that are apart in the first direction (+Y-axis direction and −Y-axis direction). The first extending arm 5212a is provided with through-holes 5214a and 5215a penetrating in the Z-axis direction and a recess 5216a which is recessed from the −Z-axis direction. Similarly, the second extending arm 5212b is provided with a plurality of through-holes 5214b and 5215b penetrating in the Z-axis direction and a recess 5216b which is recessed from the −Z-axis direction. In the present embodiment, the planar shapes of the through-holes 5214a and 5214b are circular, the planar shapes of the through-holes 5215a and 5215b are track shapes, and the planar shapes of the recesses 5216a and 5216b are track shapes, but each shape may be any shape. By providing such through-holes 5214a, 5214b, 5215a, and 5215b or the recesses 5216a and 5216b, it is possible to reduce (lighten) the mass of the first extending arm 5212a and the second extending arm 5212b, without reducing the strength of the connecting interface between the fixing anchors 4211a and 4211b and the first and second extending arms 5212a and 5212b.

According to the physical quantity sensor 1d as described above, since the plurality of through-holes 5214a and 5215a, and the recess 5216a are provided in the first extending arm 5212a and the plurality of through-holes 5214b and 5215b, and the recess 5216b are provided in the second extending arm 5212b, it is possible to reduce (lighten) the mass of the first extending arm 5212a and the second extending arm 5212b, without reducing the strength of the connecting interface between the fixing anchors 4211a and 4211b and the first and second extending arms 5212a and 5212b. That is, while maintaining the robustness of the first extending arm 5212a and the second extending arm 5212b in the connecting interface with the fixing anchors 4211a and 4211b, it is possible to reduce stress occurring in the connecting interfaces between the fixing anchors 4211a and 4211b and the first and second extending arms 5212a and 5212b. This makes it possible to reduce the risk of breakage of the first extending arm 5212a and the second extending arm 5212b due to stress concentration occurring in the connecting interface between the fixing anchors 4211a and 4211b and the first and second extending arms 5212a and 5212b.

In the fourth embodiment described above, the configuration is exemplified where the through-holes 5214a, 5215a, 5214b, and 5215b with various planar shapes, and the recesses 5216a and 5216b are provided in the first extending arm 5212a and the second extending arm 5212b in order to reduce the mass of the first extending arm 5212a and the second extending arm 5212b, but the invention is not limited thereto. In order to reduce the mass of the first extending arm 5212a and the second extending arm 5212b, any planar shape through-holes or recesses may be used, and their shape is not limited.

Figure 16:
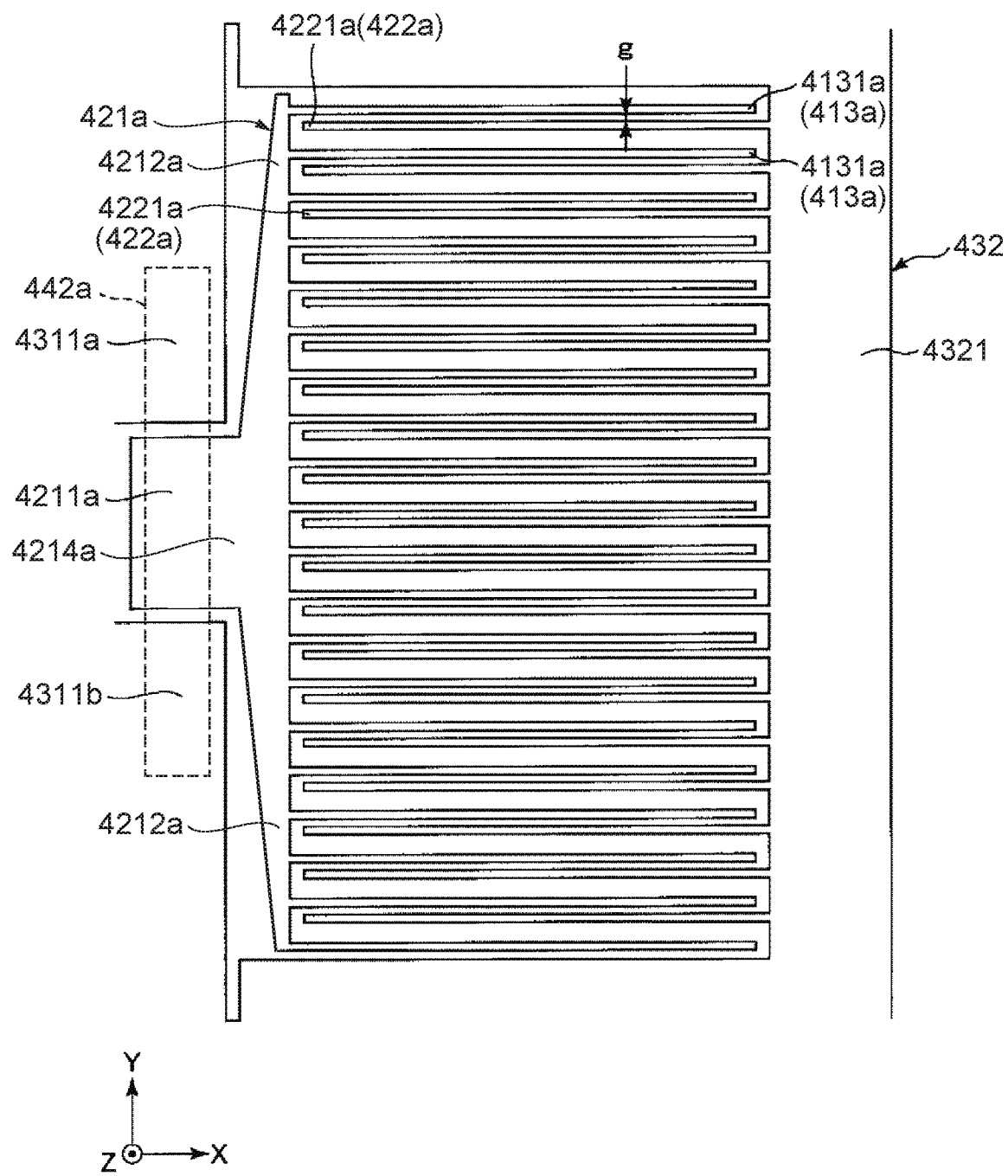
FIG. 16 is a plan view illustrating Modification Example 1 of the physical quantity sensors according to the third and fourth embodiments.
Figure 17:
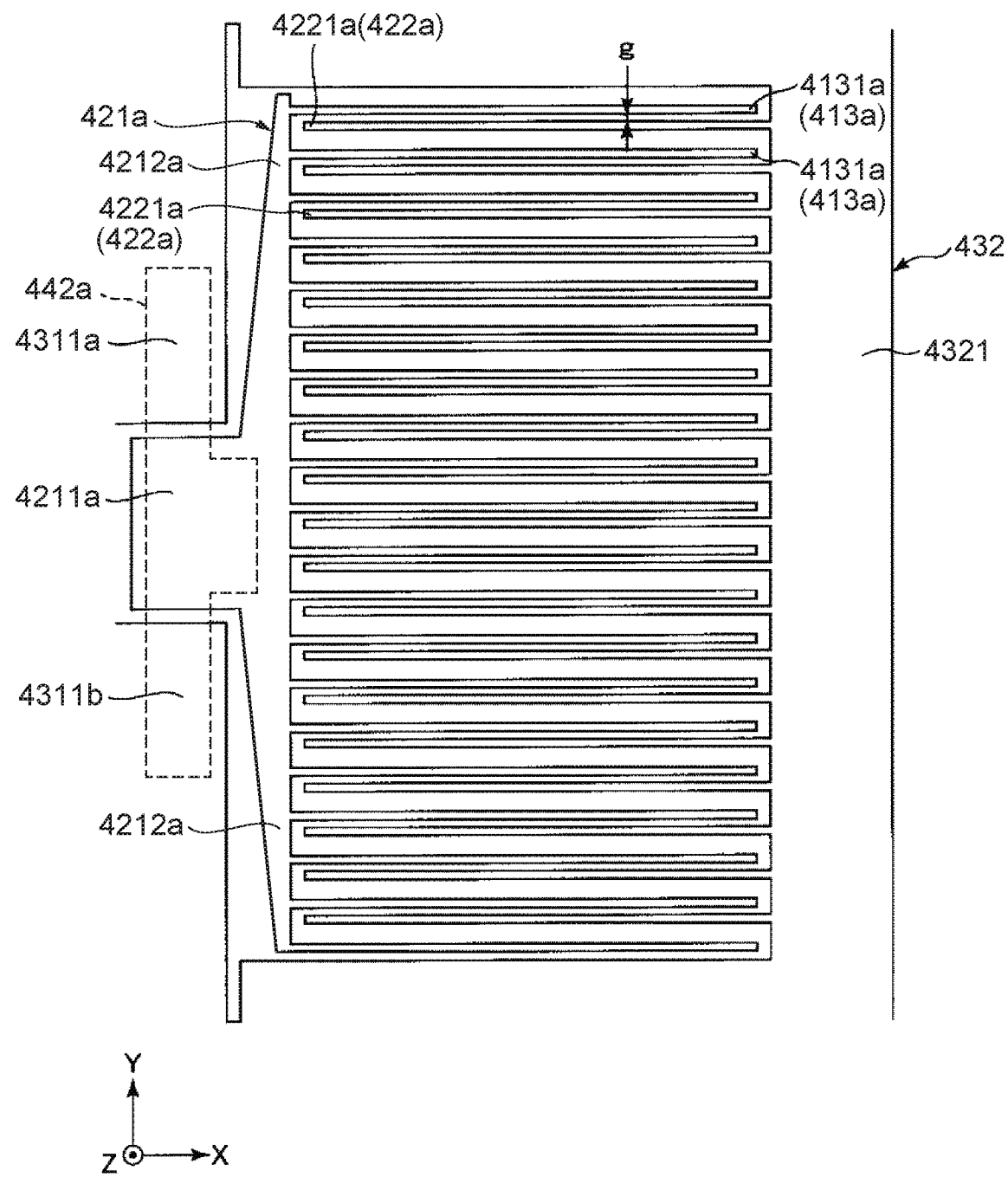
FIG. 17 is a plan view illustrating Modification Example 2 of the physical quantity sensors according to the third and fourth embodiments.
Figure 18:
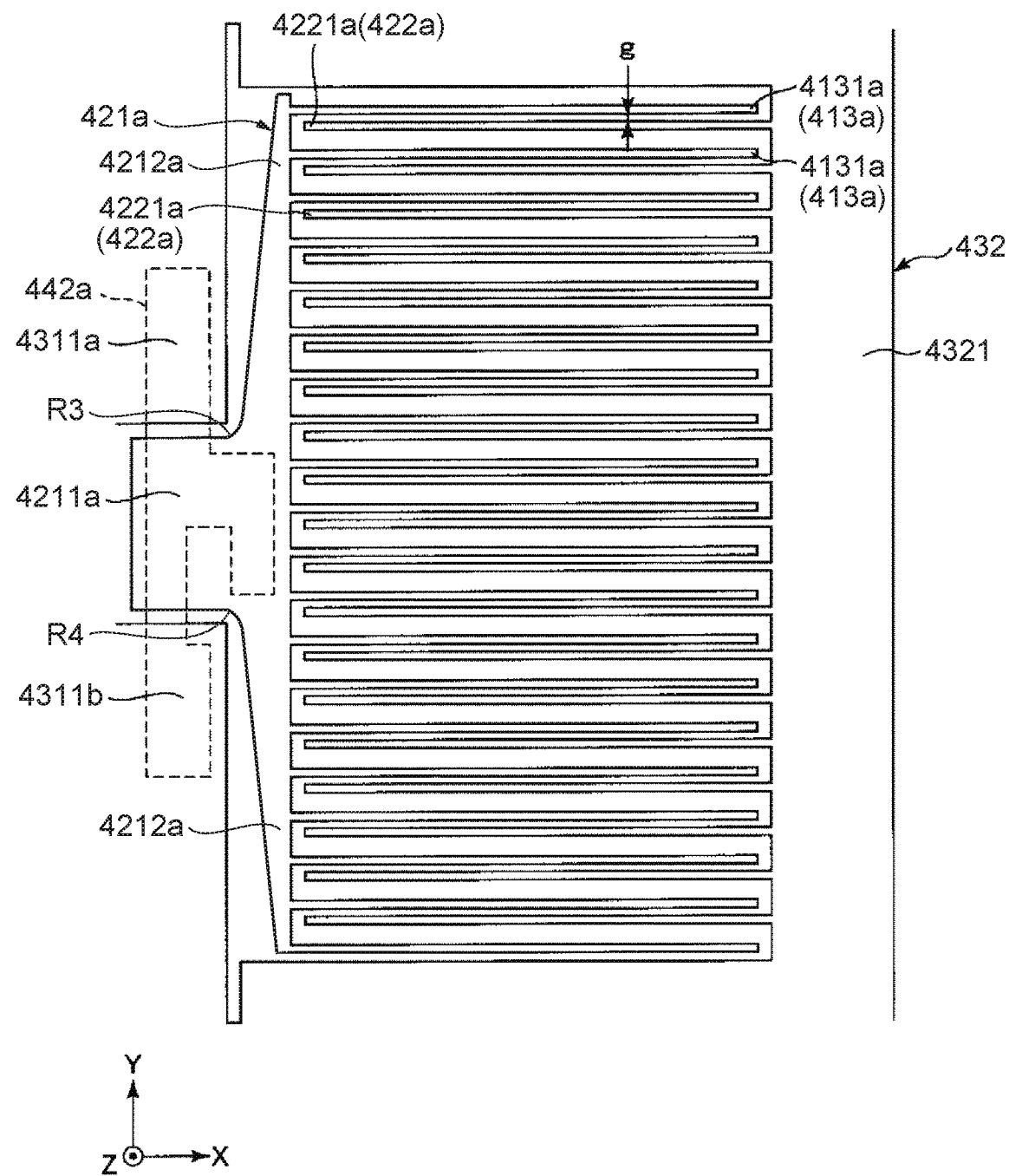
FIG. 18 is a plan view illustrating Modification Example 3 of the physical quantity sensors according to the third and fourth embodiments.

Modification Examples of Physical Quantity Sensors According to Third and Fourth Embodiments For the physical quantity sensors 1c and 1d according to the third and fourth embodiments described above, the following modification examples can be applied. Modification Example 1 to Modification Example 3 of the physical quantity sensors 1c and 1d according to the third and fourth embodiments will be described below with reference to FIGS. 16, 17, and 18. FIGS. 16, 17, and 18 illustrate modification examples of the physical quantity sensors according to the third and fourth embodiments, and FIG. 16, FIG. 17, and FIG. 18 are plan views illustrating Modification Example 1, Modification Example 2, and Modification Example 3, respectively.

Each of the following modification examples illustrates an example in which the connecting interfaces between the fixing anchors 4211a and 4211b and the first extending arms 4212a and 5212a and the second extending arms 4212b and 5212b are different. In the following description, different parts of the configuration will be described, and description of other constituent parts will be omitted. Further, in FIG.

16, FIG. 17, and FIG. 18, the connecting interface between the fixing anchor 4211a and the first extending arm 4212a in the third embodiment is described as an example, but the same can apply to the connecting interface between the fixing anchor 4211b and the second extending arm 4212b, and the connecting interface between the fixing anchors 4211a and 4211b and the first and second extending arms 5212a and 5212b in the fourth embodiment.

Modification Example 1

In Modification Example 1, as shown in FIG. 16, the fixing anchor 4211a has a connecting tab 4214a (constant width flange) extending above the main surface of the substrate 404 from the fixing anchor 4211a and being spaced apart from the main surface. The first extending arm 4212a is connected to the fixing anchor 4211a through the connecting portion 4214a. According to the configuration of Modification Example 1, the connecting portion 4214a allows the fixing anchor 4211a and the first extending arm 4212a to be connected while being spaced apart from each other, and thus it is possible to alleviate the impact propagated from the fixing anchor 4211a to the first extending arm 4212a. This makes it possible to reduce the risk of breakage of the first extending arm 4212a.

Modification Example 2

In Modification Example 2, as shown in FIG. 17, in plan view from the +Z-axis direction, the fixing anchor 4211a is provided so as to overlap (vertically align with) at least a part of the first extending arm 4212a. According to the configuration of Modification Example 2, since the fixing anchor 4211a overlaps at least a part of the first extending arm 4212a in plan view from the +Z-axis direction, the placement area occupied by the fixing anchor 4211a and the first extending arm 4212a can be reduced.

Modification Example 3

In Modification Example 3, as shown in FIG. 18, two corner portions at which the fixing anchor 4211a and the first extending arm 4212a are joined form so-called arcuate corners R3 and R4 (filets). In this way, by making the corner portions connecting the fixing anchor 4211a and the first extending arm 4212a to rounded shapes R3 and R4, it is possible to disperse the stress that is likely to be concentrated on the corner portions, thereby reducing the risk of breakage of the first extending arm 4212a.

In addition, it is possible to disperse the stress which is likely to be concentrated on the corner portions, by providing for example, a linear chamfer such as a c-chamfer, although not shown, in the vicinity of the two corner portions where the fixing anchor 4211a and the first extending arm 4212a are connected, and making the two corner portions obtuse. Further, it is possible to use a linear portion such as the c chamfer and an arcuate R chamfer as in Modification Example 3, and the same effect can be obtained.

Application Example of First Extending Arm and Second Extending Arm

Figure 19:
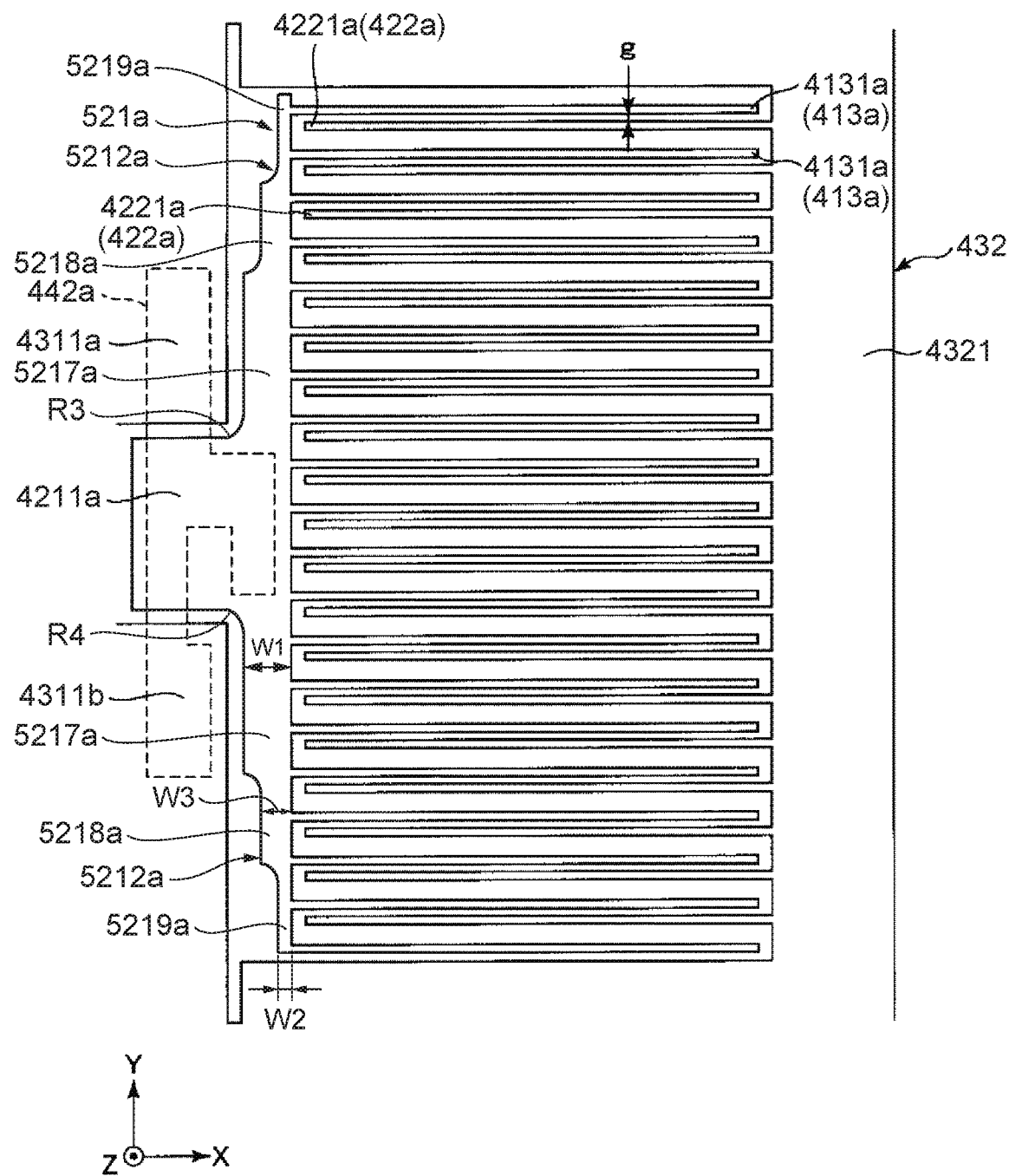
FIG. 19 is a partial enlarged plan view for explaining an application example of the first fixed electrode (first extending arm) included in the physical quantity sensor according to each embodiment.

Further, the first extending arms 212a, 1212a, 4212a, and 5212a and the second extending arms 212b, 1212b, 4212b, and 5212b of the physical quantity sensors 1, 1a, 1c, and 1d according to the first, second, third, and fourth embodiments can have a planar shape as shown in the following application example. Hereinafter, application examples of the first extending arms 212a, 1212a, 4212a, and 5212a and the second extending arms 212b, 1212b, 4212b, and 5212b will be described with reference to FIG. 19. FIG. 19 is a partial enlarged plan view for explaining an application example of the first fixed electrode (first extending arm) included in the physical quantity sensor according to each embodiment.

In the application example, as shown in FIG. 19, the first extending arm 5212a is connected to the fixing anchor 4211a, while the connecting portion at which the first extending arm 5212a and the fixing anchor 4211a are connected to each other forms arcuate corners R3 and R4. Further, the first extending arm 5212a has a stepped configuration including a first width portion 5217a having a width W1 extending from the fixing anchor 4211a, a second width portion 5218a extending from the first width portion 5217a and having a width W3 smaller than the first width portion 5217a, and a third width portion 5219a extending from the second width portion 5218a and having a width W2 smaller than the second width portion 5218a.

By adopting the first extending arm 5212a having the stepped configuration including the first width portion 5217a, the second width portion 5218a, and the third width portion 5219a, it is possible to reduce (lighten) the mass of the first extending arm 5212a, without reducing the strength of the connecting interface between the first extending arm 5212a and the fixing anchor 4211a. Further, since it is possible to reduce the mass of the tip end of the first extending arm 5212a by providing the third width portion 5219a that is away (distant) from the connecting interface with the fixing anchor 4211a, it is possible to reduce the rotational moment in the first extending arm 5212a. As such, while maintaining the robustness of the first extending arm 5212a in the connecting interface with the fixing anchor 4211a, it is possible to reduce stress occurring in the connecting interface between the fixing anchor 4211a and the first extending arm 5212a. This makes it possible to reduce the risk of breakage of the first extending arm 5212a due to stress concentration occurring in the connecting interface between the fixing anchor 4211a and the first extending arm 5212a.

2. Electronic Device

Next, electronic devices using the physical quantity sensors 1, 1a, 1c, and 1d will be described in detail with reference to FIGS. 20 to 22. In the following description, an example using the physical quantity sensor 1 will be described.

First, a mobile personal computer which is an example of an electronic device according to the invention will be described with reference to FIG. 20. FIG. 20 is a perspective view schematically showing a configuration of a mobile personal computer which is an example of an electronic device according to the invention.

Figure 20:
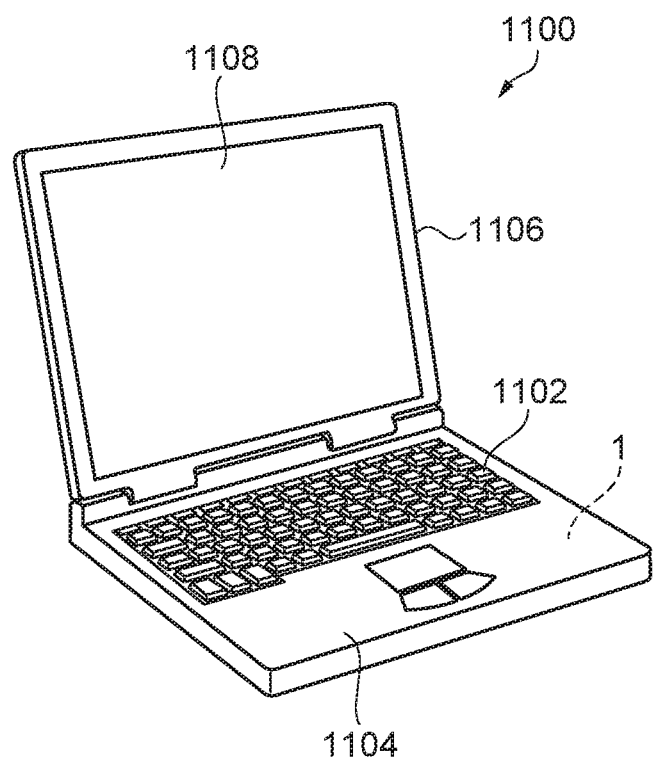
FIG. 20 is a perspective view schematically showing a configuration of a mobile personal computer which is an example of an electronic device according to the invention.

In FIG. 20, the personal computer 1100 is configured with a main body 1104 provided with a keyboard 1102 and a display unit 1106 having a display 1108, and the display unit 1106 is rotatably supported around the main body 1104 through a hinge structure. The physical quantity sensor 1 functioning as an acceleration sensor is incorporated in the personal computer 1100.

Next, with reference to FIG. 21, a description will be given of a mobile phone which is an example of the electronic device according to the invention. FIG. 21 is a perspective view schematically showing a configuration of a mobile phone which is an example of the electronic device according to the invention.

Figure 21:
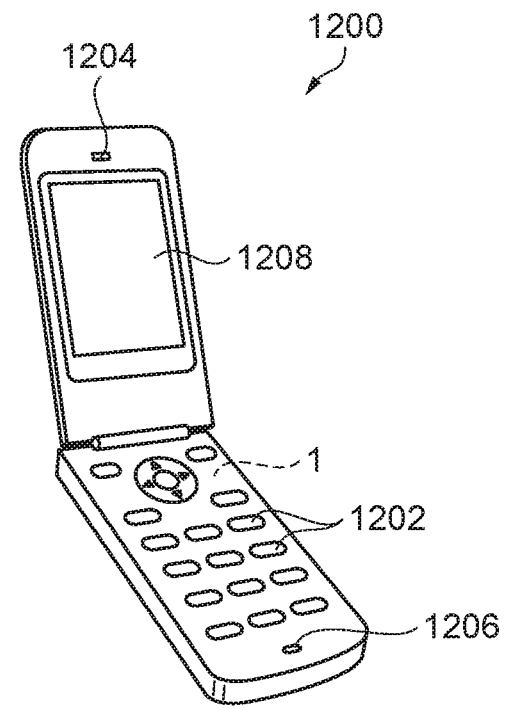
FIG. 21 is a perspective view schematically showing a configuration of a mobile phone which is an example of the electronic device according to the invention.

In FIG. 21, the mobile phone 1200 includes a plurality of operation buttons 1202, an earpiece 1204, and a mouthpiece 1206, and a display 1208 is disposed between the operation button 1202 and the earpiece 1204. The physical quantity sensor 1 functioning as an acceleration sensor is incorporated in the mobile phone 1200.

Next, with reference to FIG. 22, a digital still camera which is an example of the electronic device according to the invention will be described. FIG. 22 is a perspective view showing a configuration of a digital still camera which is an example of the electronic device according to the invention. In addition, FIG. 22 also simply illustrates the connection with the external device. Here, a normal camera exposes a silver salt photographic film to an optical image of a subject, whereas a digital still camera 1300 photoelectrically converts an optical image of a subject by an imaging element such as a charge coupled device (CCD) to generate an imaging signal (image signal).

A display 1310 is provided on the back surface of a case (body) 1302 in the digital still camera 1300 and is configured to perform display based on the imaging signal by the CCD, and the display 1310 functions as a finder that displays a subject as an electronic image. In addition, alight receiving unit 1304 including an optical lens (imaging optical system), a CCD, or the like is provided on the front surface side (the back surface side in FIG. 22) of the case 1302.

When the photographer checks the subject image displayed on the display 1310 and presses the shutter button 1306, the imaging signal of the CCD at that time is transferred and stored in the memory 1308.

Further, in the digital still camera 1300, a video signal output terminal 1312 and an input and output terminal 1314 for data communication are provided on the side surface of the case 1302. As illustrated, a TV monitor 1430 is connected to the video signal output terminal 1312, and a personal computer 1440 is connected to the input and output terminal 1314 for data communication, respectively, as necessary. Further, the imaging signal stored in the memory 1308 is output to the TV monitor 1430 or the personal computer 1440 by a predetermined operation. The physical quantity sensor 1 functioning as an acceleration sensor is incorporated in a digital still camera 1300.

Figure 22:
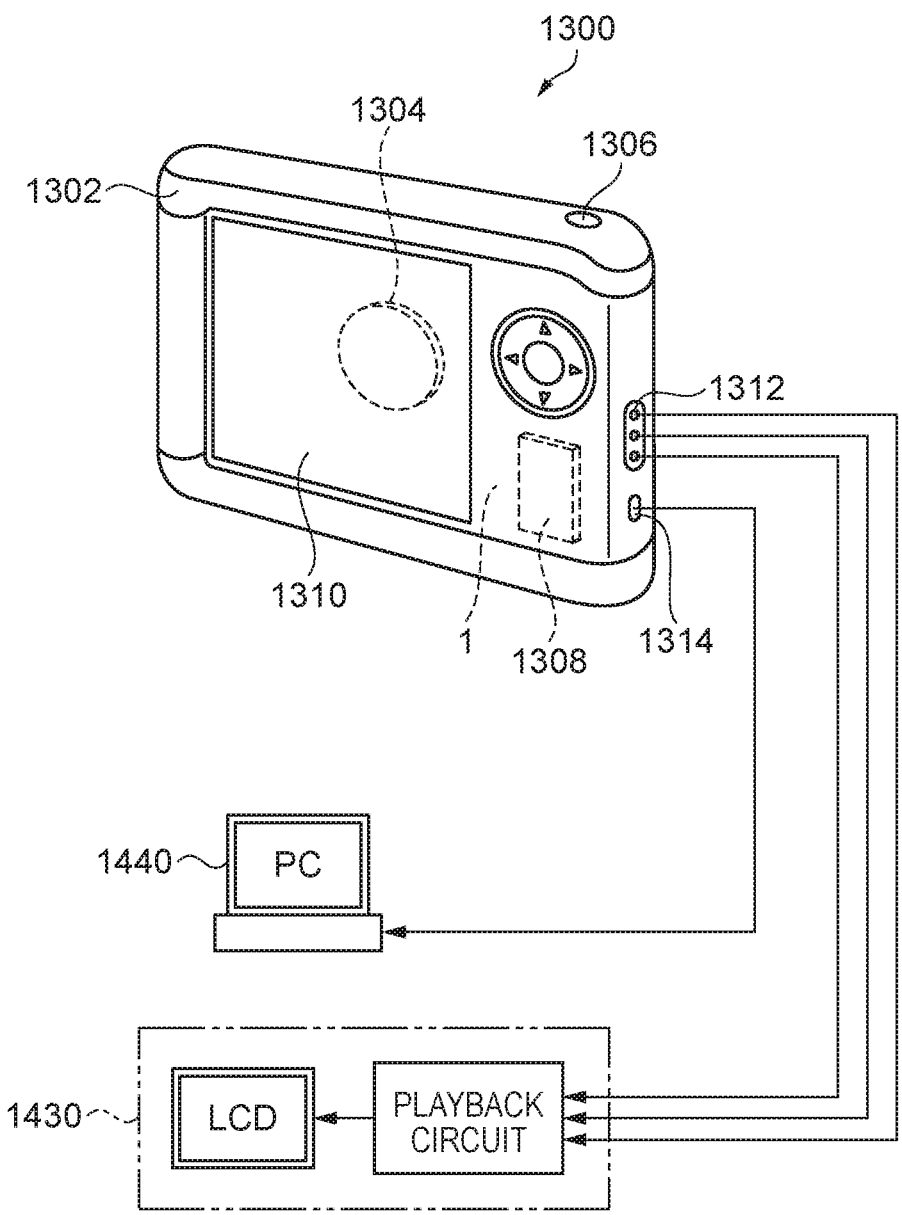
FIG. 22 is a perspective view showing a configuration of a digital still camera which is an example of the electronic device according to the invention.

In addition to the personal computer (mobile type personal computer) of FIG. 20, the mobile phone of FIG. 21, and the digital still camera of FIG. 22, the electronic device including the physical quantity sensor 1 according to the invention can be applied to, for example, a smartphone, a tablet terminal, a clock, an ink jet type discharging device (for example, an ink jet printer), a laptop personal computer, a TV, a video camera, a video tape recorder, a car navigation device, a pager, an electronic notebook (including a communication function), an electronic dictionary, a calculator, an electronic game machine, a word processor, a work station, a videophone, a security TV monitor, electronic binoculars, a POS terminal, medical equipment (for example, an electronic clinical thermometer, a blood pressure monitor, a blood glucose meter, an electrocardiogram measuring device, an ultrasonic diagnostic device, and an electronic endoscope), a fish finder, various measuring instruments, instruments (for example, instruments of vehicles, aircraft, ships), a flight simulator, and the like.

3. Vehicle

Figure 23:
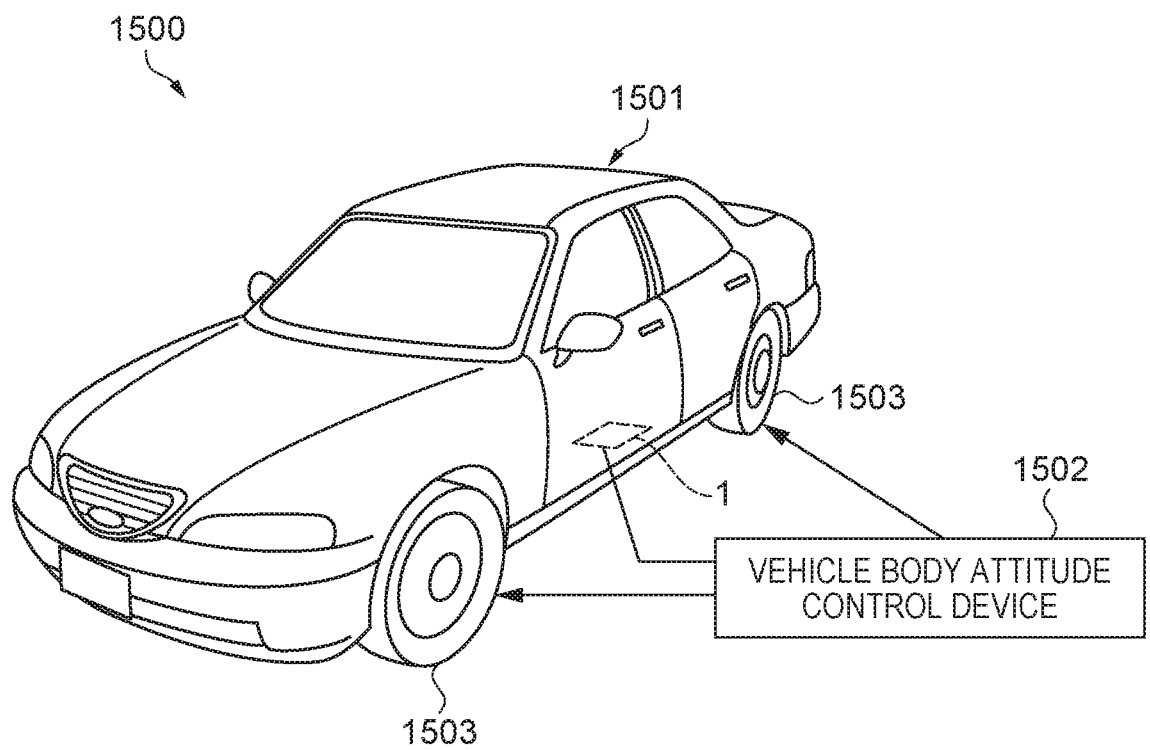
FIG. 23 is a perspective view showing a configuration of a vehicle which is an example of a vehicle according to the invention.

Next, an example using the physical quantity sensor 1 as a representative example of a vehicle using the physical quantity sensors 1, 1a, 1c, and 1d is shown in FIG. 23 and described in detail. FIG. 23 is a perspective view showing a configuration of a vehicle which is an example of a vehicle according to the invention.

The physical quantity sensor 1 functioning as an acceleration sensor is incorporated in the vehicle 1500, and the attitude of the vehicle body 1501 can be detected by the physical quantity sensor 1. The detection signal of the physical quantity sensor 1 is supplied to the vehicle body attitude control device 1502. The vehicle body attitude control device 1502 detects the attitude of the vehicle body 1501 based on the signal, and can control the hardness of the suspension according to the detection result or can control the brakes of the individual wheels 1503. In addition, such attitude control can be used in a bipedal walking robot or a radio control helicopter. As described above, the physical quantity sensor 1 is incorporated to realize attitude control of various vehicles.

Although the physical quantity sensor, the electronic device, and the vehicle according to the invention have been described based on the illustrated embodiments, the invention is not limited thereto, and the configuration of each portion may be replaced with any configuration having the same function. Further, any other constituent may be added to the invention.

The entire disclosure of Japanese Patent Application No. 2017-075011 filed Apr. 5, 2017 is expressly incorporated by reference herein.

What is claimed is:

1. A physical quantity sensor comprising:
   a base;
   a suspension beam facing the base;
   an anchor fixing the suspension beam to the base;
   a fixed electrode extending orthogonally from the suspension beam, in a plan view; and
   a movable electrode facing the fixed electrode across an interval,
   wherein a width of the suspension beam is tapered from a proximal end adjacent the anchor to a distal end distant from the anchor, in the plan view.

2. A physical quantity sensor comprising:
   a base;
   a suspension beam facing the base, the suspension beam including two major surfaces and two edge surfaces, the suspension beam being a cantilever beam fixed on a first end and suspended over the base;
   an anchor fixing the first end of the suspension beam to the base;
   a fixed electrode extending orthogonally from the two edge surfaces of the suspension beam, in a plan view; and
   a movable electrode facing the fixed electrode across an interval,
   wherein the suspension beam includes at least one of:
      a recess in at least one of the two major surfaces; and
      a through-hole.

3. The physical quantity sensor according to claim 2, wherein the suspension beam is tapered from a proximal end to a distal end.

4. The physical quantity sensor according to claim 1, further comprising:
   a protrusion protruding from the base and engaging the anchor,
   wherein in the plan view, the protrusion is spaced apart from the proximal end of the suspension beam.

5. The physical quantity sensor according to claim 2, further comprising:

a protrusion protruding from the base and engaging the anchor, wherein in the plan view, the protrusion is spaced apart from a proximal end of the suspension beam.

6. The physical quantity sensor according to claim 1, further comprising:

a connecting tab disposed between the suspension beam and the anchor, the connecting tab being connected to the suspension beam and the anchor.

7. The physical quantity sensor according to claim 2, further comprising:

a connecting tab disposed between the suspension beam and the anchor, the connecting tab being connected to the suspension beam and the anchor.

8. The physical quantity sensor according to claim 1, further comprising:

a protrusion protruding from the base and engaging the anchor, wherein in the plan view, at least a part of the protrusion overlaps at least a part of the suspension beam.

9. The physical quantity sensor according to claim 2, further comprising:

a protrusion protruding from the base and engaging the anchor, wherein in the plan view, at least a part of the protrusion overlaps at least a part of the suspension beam.

10. The physical quantity sensor according to claim 1, further comprising:

a second suspension beam, wherein in the plan view, the anchor is disposed between the suspension beam and the second suspension beam.

11. The physical quantity sensor according to claim 2, further comprising:

a second suspension beam, wherein in the plan view, the anchor is disposed between the suspension beam and the second suspension beam.

12. A vehicle comprising:

the physical quantity sensor according to claim 1; and an attitude control device that controls an attitude, based on a detection signal from the physical quantity sensor.

13. A vehicle comprising:

the physical quantity sensor according to claim 2; and an attitude control device that controls an attitude, based on a detection signal from the physical quantity sensor.

14. A physical quantity sensor comprising:

a base;

a protrusion protruding from the base;

an anchor mounted to the protrusion so as to be spaced apart from the base;

a suspension beam having a proximal end joined to the anchor and a distal end distant from the anchor so that the suspension beam is cantilevered from the anchor relative to the base, the suspension beam including two major surfaces and two edge surfaces;

a fixed electrode comb extending orthogonally from the two edge surfaces of the suspension beam, in a plan view; and a movable electrode comb interleaved with the fixed electrode comb across an interval, wherein the suspension beam either:

tapers from the proximal end to the distal end, in the plan view; or includes a recess in at least one of the two major surfaces, or a through-hole.

15. The physical quantity sensor according to claim 14, wherein the suspension beam is tapered from the proximal end to the distal end.

16. The physical quantity sensor according to claim 14, wherein in the plan view, the protrusion is spaced apart from the proximal end of the suspension beam.

17. The physical quantity sensor according to claim 14, further comprising:

a connecting tab disposed between the suspension beam and the anchor, the connecting tab being connected to the suspension beam and the anchor.

18. The physical quantity sensor according to claim 14, wherein in the plan view, at least a part of the protrusion overlaps at least a part of the suspension beam.

19. The physical quantity sensor according to claim 14, further comprising:

a second suspension beam, wherein in the plan view, the anchor is disposed between the suspension beam and the second suspension beam.

20. The physical quantity sensor according to claim 1, wherein the suspension beam extends along a first direction from the anchor, the fixed electrode is one of a plurality of fixed electrodes extending along a second direction orthogonal to the first direction, and the plurality of fixed electrodes consistently increase in length from a proximal end fixed electrode to a distal end fixed electrode.

* * * * *